US012725278B2

(12) United States Patent
Frazier et al.

(10) Patent No.: US 12,725,278 B2
(45) Date of Patent: Sep. 1, 2026

(54) SYSTEM AND METHOD FOR COMPUTER-VISION BASED TRACKING AND GUIDING OF LIQUID TRANSFER OPERATIONS

(71) Applicant: Saddlepoint Labs LLC, Ithaca, NY (US)

(72) Inventors: Peter Frazier, Ithaca, NY (US); Nicholas Abbott, Lansing, NY (US); Henry W. Robbins, Louisville, KY (US)

(73) Assignee: Saddlepoint Labs LLC, Ithaca, NY (US)

( * ) Notice: Subject to any disclaimer, the term of this patent is extended or adjusted under 35 U.S.C. 154(b) by 0 days.

(21) Appl. No.: 19/545,281

(22) Filed: Feb. 20, 2026

(65) Prior Publication Data

US 2026/0179232 A1 Jun. 25, 2026

Related U.S. Application Data

(63) Continuation of application No. 19/320,431, filed on Sep. 5, 2025.

(60) Provisional application No. 63/691,281, filed on Sep. 5, 2024.

(51) Int. Cl.

| | |
|---|---|
| ***G06T 7/20*** | (2017.01) |
| ***G06T 7/13*** | (2017.01) |
| ***G06T 7/62*** | (2017.01) |
| ***G06T 7/70*** | (2017.01) |

(52) U.S. Cl.
CPC .................. *G06T 7/20* (2013.01); *G06T 7/13* (2017.01); *G06T 7/62* (2017.01); *G06T 7/70* (2017.01)

(58) Field of Classification Search
CPC .... G06T 7/20; G06T 7/13; G06T 7/62; G06T 7/70
See application file for complete search history.

(56) References Cited

U.S. PATENT DOCUMENTS

| | | | | |
|---|---|---|---|---|
| 8,818,821 | B2 * | 8/2014 | Fioravanti | G16H 20/17 705/2 |
| 2012/0145255 | A1 * | 6/2012 | Spano, Jr. | A61L 9/14 137/87.03 |
| 2016/0291049 | A1 * | 10/2016 | Arumugam | G01F 23/292 |

(Continued)

*Primary Examiner* — Umair Ahsan
(74) *Attorney, Agent, or Firm* — Padowithz Alce; Alce PLLC

(57) ABSTRACT

A system, method, and computer-program product includes; detecting, by one or more processors, a position and an orientation of transfer component of the liquid-transferring device based on image data from a liquid-transferring operation between a liquid-transferring device and a sample plate; generating, by the one or more processors, a pointing vector extending along a substantially central axis of the transfer component; determining, by the one or more processors, a liquid-reception boundary representing a rim of a reception component of the sample plate; identifying, by the one or more processors, an intersection point of the pointing vector and the liquid-reception boundary; detecting, by the one or more processors, whether the transfer component is within a successful liquid transfer position of the rim of the reception component; and outputting, via a user interface, an engagement status indicating whether the transfer component is within the successful liquid transfer position.

20 Claims, 26 Drawing Sheets

200

Obtain Image Data from a Liquid-Transferring Operation between a Liquid-Transferring Device and Sample Plate S210

Detect a Position and Orientation of a Transfer Component of the Liquid-Transferring Device S220

Generate a Pointing Vector Extending Along a Substantially Central Axis of the Transfer Component S230

Determine a Liquid-Reception Boundary Representing a Rim of a Reception Component of the Sample Plate S240

Identify an Intersection Point of the Pointing Vector with the Liquid-Reception Boundary S250

Detect whether the Transfer Component is within a Successful Liquid Transfer Position of the Rim of the Reception Component S260

Output an Engagement Status Indicating whether the Transfer Component is within the Successful Liquid Transfer Position S270

(56) References Cited

U.S. PATENT DOCUMENTS

| | | | | |
|---|---|---|---|---|
| 2017/0084157 | A1* | 3/2017 | Lucas | G08B 21/182 |
| 2017/0370956 | A1* | 12/2017 | Hurwitz | B01L 9/56 |
| 2022/0042983 | A1* | 2/2022 | Harder | G01N 35/04 |

* cited by examiner

100B

Figure 2:
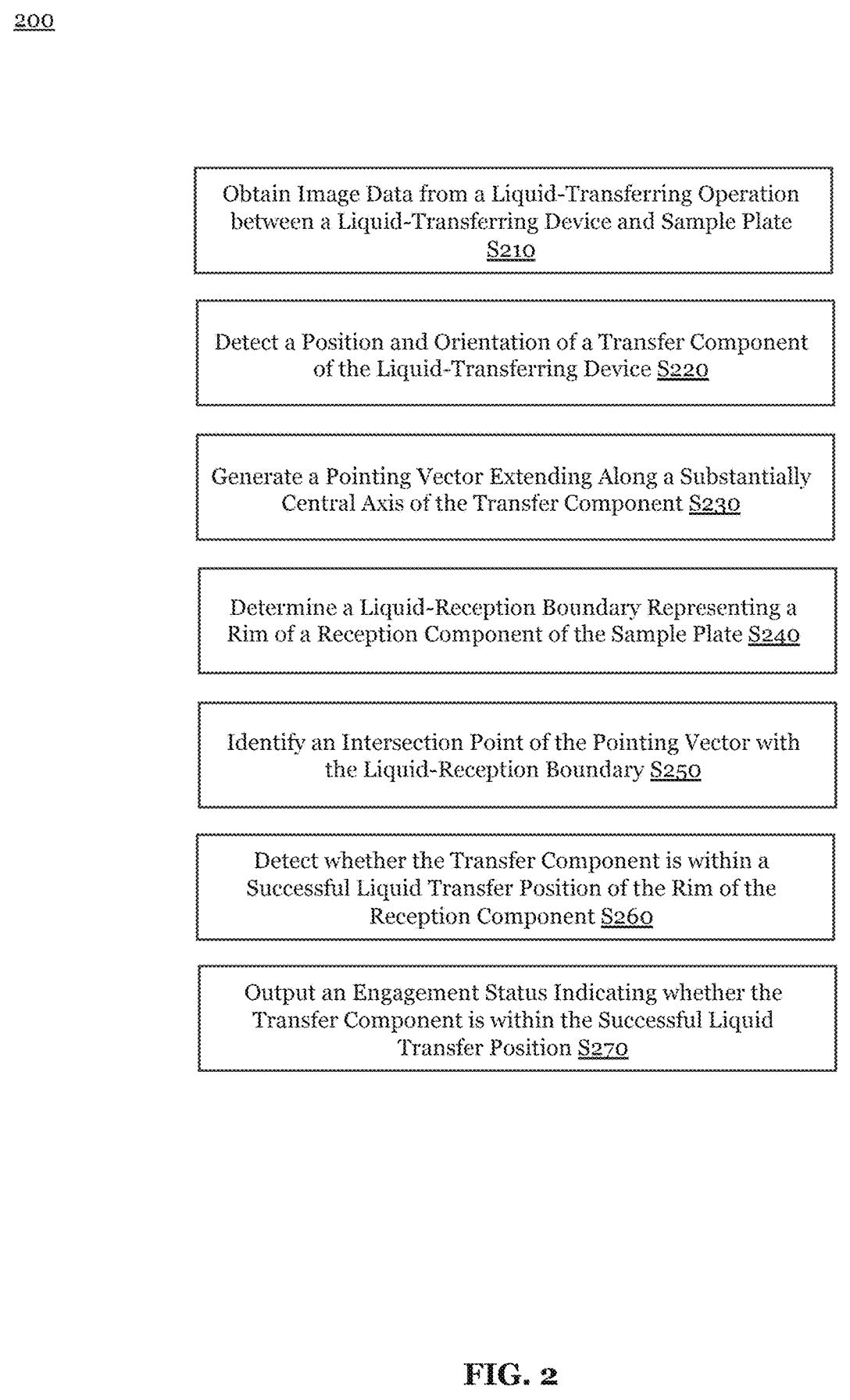

200

Obtain Image Data from a Liquid-Transferring Operation between a Liquid-Transferring Device and Sample Plate S210

Detect a Position and Orientation of a Transfer Component of the Liquid-Transferring Device S220

Generate a Pointing Vector Extending Along a Substantially Central Axis of the Transfer Component S230

Determine a Liquid-Reception Boundary Representing a Rim of a Reception Component of the Sample Plate S240

Identify an Intersection Point of the Pointing Vector with the Liquid-Reception Boundary S250

Detect whether the Transfer Component is within a Successful Liquid Transfer Position of the Rim of the Reception Component S260

Output an Engagement Status Indicating whether the Transfer Component is within the Successful Liquid Transfer Position S270

SYSTEM AND METHOD FOR COMPUTER-VISION BASED TRACKING AND GUIDING OF LIQUID TRANSFER OPERATIONS

CROSS-REFERENCE TO RELATED APPLICATIONS

This application is a continuation of U.S. patent application Ser. No. 19/320,431, filed 5 Sep. 2025, which claims the benefit of U.S. Provisional Application No. 63/691,281, filed on 5 Sep. 2024, which is incorporated in its entirety by this reference.

TECHNICAL FIELD

This invention relates generally to computer-assisted laboratory systems and more specifically, to computer-implemented techniques for monitoring and guiding liquid transfer operations.

BACKGROUND

Liquid transfer procedures are fundamental operations in biological, chemical, and clinical settings. Many experimental protocols rely on accurate delivery of reagents from a liquid-transferring device, such as a pipette or syringe, into a sample plate, such as a well plate, microtube, or assay container. Deviations in liquid transfer accuracy may introduce significant sources of variability in experimental results, such as cross-contamination.

Conventional liquid handling practices often rely on manual pipetting, semi-automated dispensing systems, or fully-automated dispensing systems (e.g., liquid-handling robots) that lack real-time feedback regarding the position of a liquid transfer component relative to the sample plate. For instance, existing systems may not reliably differentiate between conditions in which the transfer component is aligned above a receptacle, inserted within the receptacle, or positioned in close proximity to the receptacle. As a result, laboratory personnel may be unable to confirm whether a transfer action has been performed correctly. Accordingly, there is a need for an alternative approach that reduces risk of deviations in liquid transfer accuracy and enables traceability in the event that deviations do occur.

BRIEF SUMMARY OF THE INVENTION(S)

In some examples, a computer-implemented method for tracking liquid transfer between a liquid-transferring device and a sample plate may include obtaining image data, captured by at least one sensing device, from a liquid-transferring operation between the liquid-transferring device and the sample plate; detecting, by one or more processors executing a computer vision model, a position and an orientation of a transfer component of the liquid-transferring device based at least in part on an input of the image data into one or more object pose estimation models; generating, by the one or more processors, a pointing vector extending along a substantially central axis of the transfer component based on the detected position and the detected orientation of the transfer component; determining, by the one or more processors, a liquid-reception boundary representing a rim of a reception component of the sample plate; identifying, by the one or more processors, an intersection point of the pointing vector and the liquid-reception boundary; detecting, by the one or more processors and based at least in part on the identified intersection point, whether the transfer component is within a successful liquid transfer position of the rim of the reception component, wherein the detecting comprises: identifying a portion of the image data representing a region around the transfer component; outputting, by the engagement inference classifier and based on the identified portion of the image data, an engagement inference indicating whether the position and the orientation of the transfer component is within the successful liquid transfer position relative to the rim of the reception component; and outputting, via a user interface and based at least in part on the engagement inference, an engagement status indicating whether the position and the orientation of the transfer component is within the successful liquid transfer position relative to the rim of the reception component.

BRIEF DESCRIPTION OF THE FIGURES

FIG. 2 illustrates an example method 200 in accordance with one or more embodiments of the present application;

DESCRIPTION OF THE PREFERRED EMBODIMENTS

Figure 1:
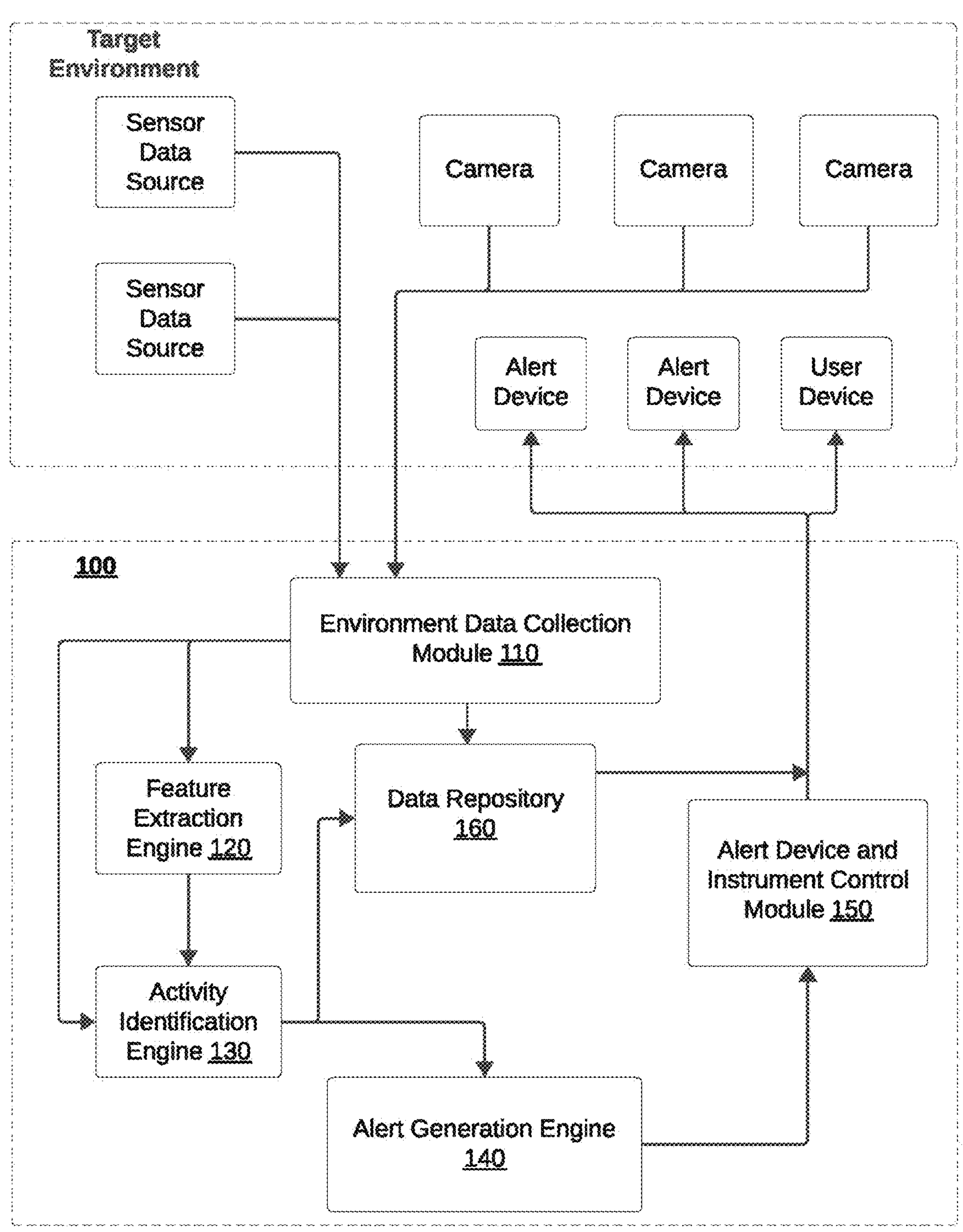
FIG. 1 illustrates a schematic representation of a system 100 in accordance with one or more embodiments of the present application.

The following description of the preferred embodiments of the inventions are not intended to limit the inventions to these preferred embodiments, but rather to enable any person skilled in the art to make and use these inventions.

Liquid transfer procedures are widely performed in biological, chemical, and clinical settings as part of experimental workflows. Such procedures may involve transferring precise quantities of liquid between a liquid-transferring device, such as a pipette, syringe, or dispenser, and a sample plate, such as a microplate, microtube, or assay container. Accuracy of liquid transfer operations may directly affect experimental outcomes, and errors in performing the transfer may result in cross-contamination, volume inconsistency, or loss of reproducibility across experimental runs.

Conventional liquid handling practices may rely on manual handling of liquid-transferring devices to transfer fluids as performed by laboratory personnel. Manual handling of liquid-transferring devices may not inherently provide feedback regarding whether the liquid-transferring device has been positioned correctly relative to the sample plate. For instance, if the liquid-transferring device is a pipette and the sample plate is a well plate, existing practices may be unable to distinguish whether a tip of the pipette is above the rim of a well of the well plate, inside the well, or in close proximity to the well without entering. Such ambiguities may lead to undetected transfer errors and difficulties in identifying root causes of failed assays.

Such limitations may give rise to risks including contamination from improper positioning of a liquid-transferring device, variation in assay readouts caused by inconsistent timing of reagent addition, and lack of traceability of user-performed actions. For instance, laboratories may lack data regarding when a liquid-transferring device engaged with a sample plate, how long the liquid-transferring device remained engaged, and whether the engagement conformed to the intended protocol. Without such traceability, reproducing experimental conditions or performing root-cause analysis on assay failures may be difficult or impossible.

The techniques described herein may address these issues by employing a sensing assembly configured to capture image data of liquid transfer operations and a computing platform configured to analyze the image data in real time. The computing platform may detect a location and orientation of a transfer component of a liquid-transferring device (e.g., a liquid aspirating tip of a liquid-transferring device), generate a pointing vector aligned with a substantially central axis of the transfer component, determine an intersection of the pointing vector with a liquid-reception boundary of a sample plate, and apply a depth-based classifier to produce an engagement inference indicating whether the transfer component is within the receptacle. By producing an engagement inference and corresponding engagement status, the computing platform may provide visual indicators in real-time to laboratory personnel, thereby enabling confirmation of correct liquid-transferring device placement.

Further, the techniques described herein may generate traceability data for each engagement, including timestamps, durations, and identifiers of reception components within the sample plate, enabling later review of liquid transfer sequences and root-cause determination of assay outcomes. Additional features may include enforcement of transfer event logic rules to detect deviations from liquid handling protocols, generation of compliance notifications, instant replay of recent transfer actions for user verification, recording of transfers across multiple receptacles, and adjustment of assay measurements based on timing deviations. Technical benefits of these techniques may include improved reproducibility of experimental results, reduction of cross-contamination events, objective validation of user actions, and enhanced efficiency in both training and experimental workflows.

1. System for Automatically Observing and Supervising Activities in an Environment As shown in FIG. 1, a system 100 for automatically observing and supervising activities in an environment includes an environment data collection module 110, a feature extraction engine 120, an activity identification engine 130, an alert generation engine 140, and an alert device control module 150. In some embodiments, system 100 may additionally include a data repository 160.

In various embodiments, system 100 may be implemented and/or installed in environments that may include, but are not limited to, wet chemistry laboratories, biological research laboratories, clinical trial testing laboratories, and/or any other suitable laboratory environment for the observation and supervision of environment activities. Additionally, in various embodiments, system 100 may be implemented and/or installed in environments including, but not limited to, medical clinics, oil refineries, chemical manufacturing plants, manufacturing facilities, construction sites, restaurants, home kitchens, and/or any other suitable environment for the observation and supervision of environment activities.

1.1 Environment Data Collection Module

The environment data collection module 110 may preferably function to source, collect, and/or aggregate environment data that may be processed, stored, and/or otherwise used by system 100 and/or one or more users of system 100. In various embodiments environment data collection module 110 may be in operable communication with and/or source environment data from one or more sensors, detectors, sensor arrays, cameras, instruments, apparatuses, and/or the like that may be arranged to collect environment data from a target environment. In various embodiments, environment data collection module 110 may function to store collected data in and/or retrieve environment data from data storage that may be included in the one or more sensors, detectors, sensor arrays, cameras, instruments, apparatuses, and/or the like. Additionally, or alternatively, in some embodiments environment data collection module 110 may source or receive stored environment data from one or more local or remote servers, cloud storage, and/or any other suitable data storage device. Additionally, or alternatively, in some embodiments, the data stored can be used to design future experiments, make predictions, or identify optimal manufacturing process conditions. Preferably, environment data collected by environment data collection module 110 may include visual or audiovisual environment data sourced from one or more cameras arranged with a field of view that includes the target environment.

1.2 Feature Extraction Engine

The feature extraction engine 120 may preferably function to extract one or more activity features relating to one or more tasks, actions, and/or any other activities performed or executed in the target environment (as described in 2.2). In various embodiments, feature extraction engine 120 may function to transform raw environment data into a format or structure that captures information relevant to activities performed or executed in the target environment. Preferably, feature extraction engine 120 may assess or analyze input environment data and output one or more activity features extracted from the environment data. In some preferred embodiments, feature extraction engine 120 may function to process visual or audiovisual environment data (e.g., video data) and in turn extract one or more patterns, structures, objects, entities/actors, and/or any other salient visual information from the input visual or audiovisual environment data.

1.3 Activity Identification Engine

The activity identification engine 130 may preferably function to identify one or more environment activities performed or executed in the target environment based on an input of one or more extracted activity features and/or collected environment data (as described in 2.3). In various embodiments, activity identification engine 130 may function to compute or output one or more environment activity inferences that may each include a label or classification of an associated environment activity, a quality assessment of an associated environment activity, and/or temporal boundaries that may define start and end timestamps of an associated environment activity. Additionally, or alternatively, in one or more embodiments, activity identification engine 130 may function to identify one or more environment activity temporal sequences that may relate to a target process being performed or executed in the target environment.

In various embodiments, feature extraction engine 120 and/or activity identification engine 130 may implement or otherwise employ one or more machine learning algorithms and/or one or more ensembles of trained machine learning models. In such embodiments, the one or more machine learning algorithms and/or one or more ensembles of trained machine learning models may include one or more of: supervised learning (e.g., using logistic regression, using neural networks trained with backpropagation, using random forests, decision trees, etc.), unsupervised learning (e.g., using an Apriori algorithm, using K-means clustering), semi-supervised learning, weakly-supervised learning, reinforcement learning (e.g., using Q-learning, using temporal difference learning), adversarial learning, and any other suitable learning style. Each engine or component of system 100 may additionally or alternatively implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, Gaussian process regression, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), LLaMA, LLaMA 2 (and subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein. It shall be noted that, in some embodiments, feature extraction engine 120 and/or activity identification engine 130 may not implement or employ machine learning algorithms or models.

1.4 Alert Generation Engine

The alert generation engine 140 may preferably function to generate one or more environment activity alerts based on one or more identified environment activities and/or one or more identified environment activity sequences. In various embodiments, alert generation engine 140 may function to generate environment activity alerts to provide information and/or notification(s) regarding one or more environment activities and/or activity sequences to one or more actors or entities in the target environment. In some embodiments, alert generation engine 140 may evaluate identified environment activities and/or environment activity sequences against one or more standard operating procedures (described in 2.4), and in turn alert generation engine 140 may function to trigger a generation of and/or a transmission of one or more environment activity alerts based on the evaluation. In some embodiments, alert generation engine 140 may function to generate one or more distinct types of environment activity alerts.

1.5 Alert Device and Instrument Control Module

The alert device and instrument control module 150 may preferably function to automatically control one or more alert devices or instruments based on generated environment activity alerts (as described in 2.4). In one or more embodiments, alert device control module 150 may function to generate and/or transmit one or more alert device control signals for each generated environment activity alert. In various embodiments, alert device and instrument control module 150 may function to control one or more alert devices including, but not limited to, one or more audio alert devices (e.g., speakers, sirens, buzzers, and/or the like), one or more visual alert devices (e.g., flashing lights, strobes, and/or the like), one or more electronic displays, one or more user devices, one or more wearable devices (e.g., display integrated into safety glasses), and/or any other suitable device for alerting or communicating an alert or notification.

Additionally, or alternatively, in some embodiments, the alert device and instrument control module 150 may generate control signals including, but not limited to, computer-executable instructions that modulate an operation of one or more instruments and/or machines (e.g., adjust the temperature setting for a stir plate or temperature stage, turn off or adjust the speed of a pump and/or or the like) in the activity environment being observed by the system 100. In one or more embodiments, the system 100 may additionally alert a human operator that the system 100 may be controlling the one or more instruments and/or machines. The environment data collection module 110 operating in operable communication with the alert device and instrument control module 150 may generate and/or provide a direct or indirect signal to the alert device and instrument control module 150 of a variable or device being controlled based on the data collected from the activity environment. As a non-limiting example, the environment data collection module 110 may provide an indirect visual indicator via a display of a wearable device or other device that may be accessible to a human operator. That is, in such example, unlike a thermostat which may control a temperature based on a temperature sensor readout (e.g., thermocouple), the system 100 may use a visual indicator of temperature, e.g., smoke, a visual appearance of boiling liquid, and/or an appearance of a reactant.

1.6 Data Repository

The data repository 160 may preferably function to receive, store, organize, and manage environment data, extracted activity feature data, environment activity data, and/or any other data or metadata generated and/or otherwise used by system 100 and/or one or more users or subscribers of system 100 or a service implementing system 100. In various embodiments, data repository 160 may be in operable communication with one or more components of system 100 to provide access to data stored in data repository 160 and/or to collect data from one or more components of system 100. In some embodiments, data repository 160 may include a plurality of data repositories 160. Additionally, or alternatively, in some embodiments, data repository 160 may include and/or be in operable communication with one or more remote data storage devices and/or remote data repositories (e.g., remote servers, cloud storage, and/or the like).

1.00A System for Image-Based Tracking of a Liquid Transferring Operation

Figure 1A:
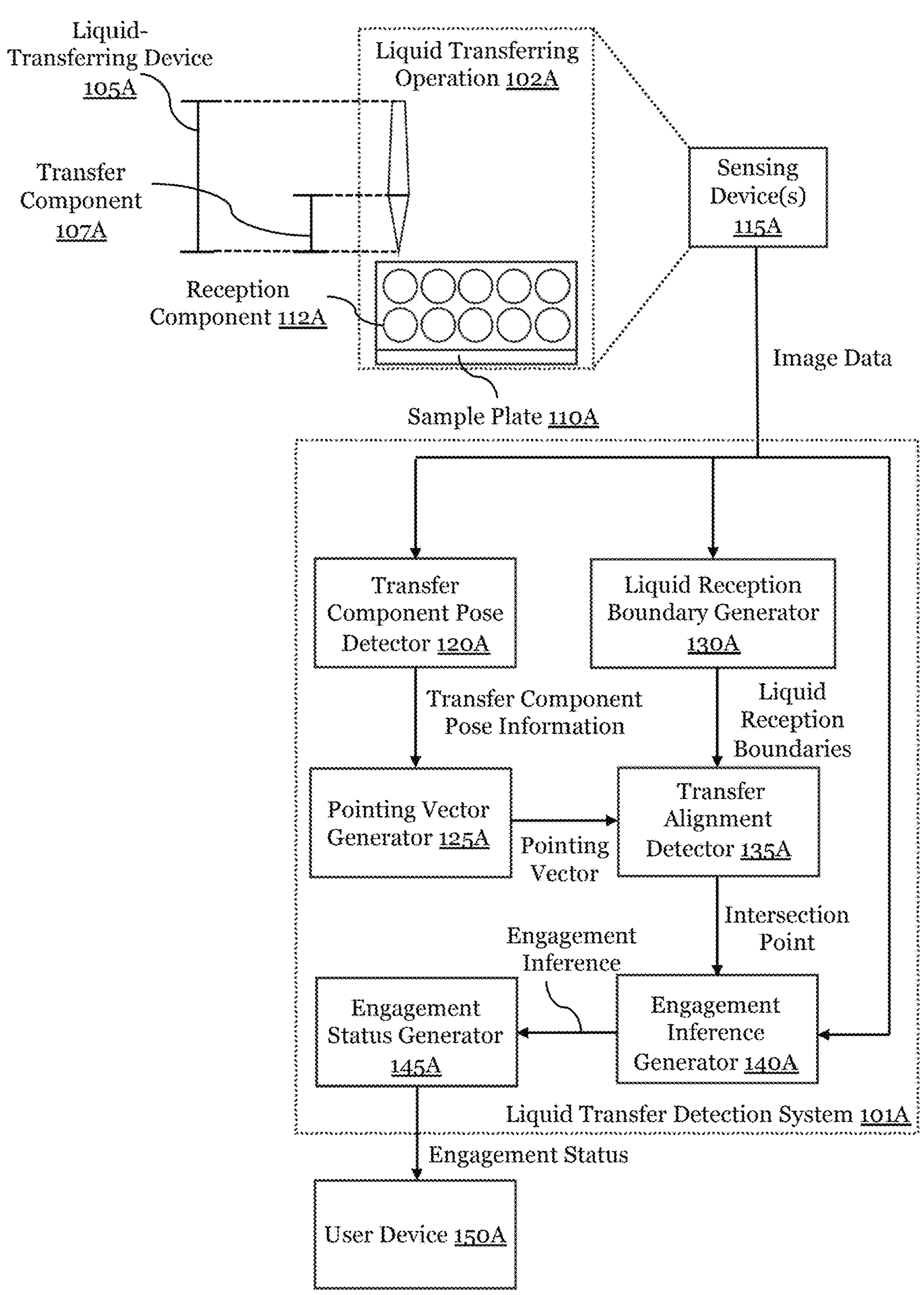
FIG. 1A illustrates a schematic representation of a system 100A in accordance with one or more embodiments of the present application.
Figure 1B:
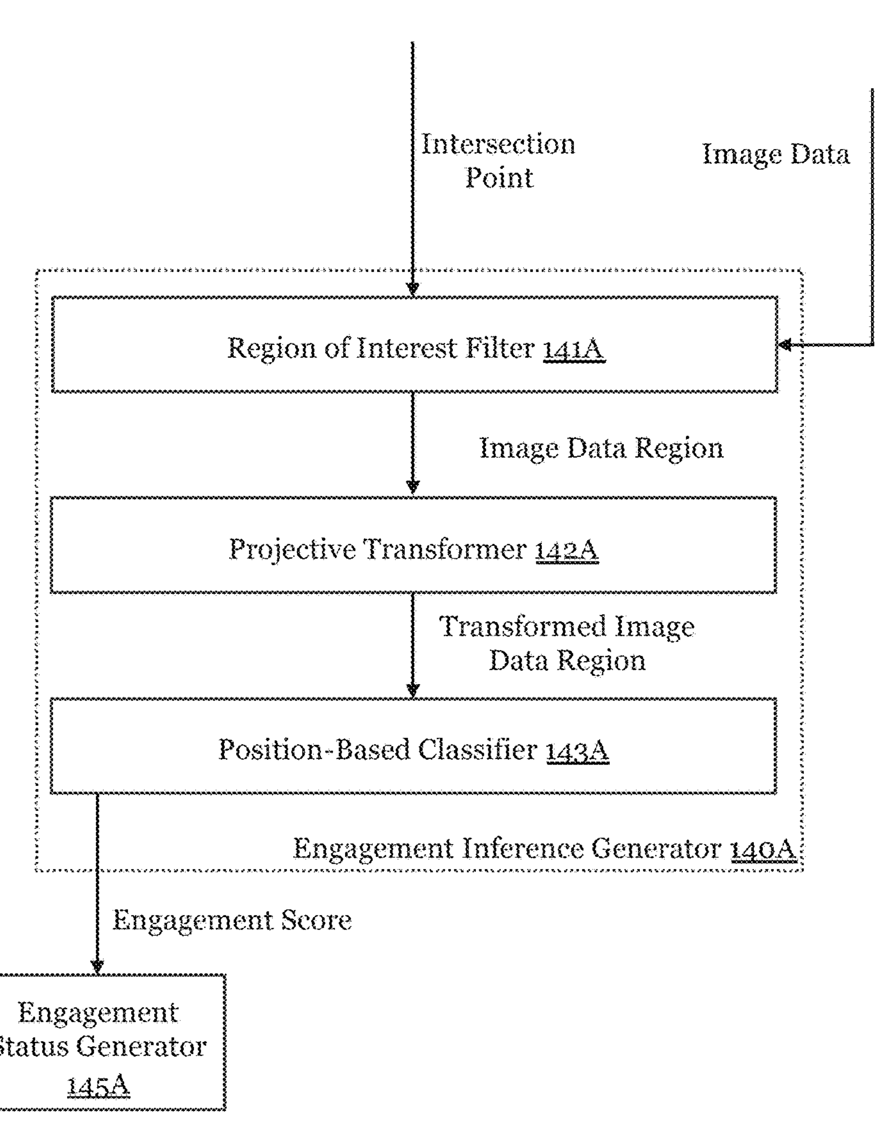
FIG. 1B illustrates a schematic representation of an engagement score generator architecture 100B in accordance with one or more embodiments of the present application.

As shown in FIG. 1A, a liquid transferring operation 102A may occur between a liquid-transferring device 105A and a sample plate 110A. The liquid-transferring device 105A may include a transfer component and the sample plate 110A may include one or more reception components 112A. The liquid transferring operation 102A may be captured by one or more sensing devices 115A and image data (e.g., depth image data) from the liquid transferring procedure may be provided to liquid transfer detection system 101A. Liquid transfer detection system 101A may include a transfer component pose detector 120A, a pointing vector generator 125A, a liquid reception boundary generator 130A, a transfer alignment detector 135A, an engagement inference generator 140A, and an engagement status generator 145A. The liquid transfer detection system 101A may receive the image data and may output an engagement status to user device 150A (e.g., via a user interface). Additionally, as shown in FIG. 1B, the engagement inference generator 140A may include a region of interest filter 141A, a projective transformer 142A, and an engagement inference classifier 143A.

1.05A Liquid-Transferring Device

Liquid-transferring device 105A may be a liquid-holding container configured to supply a liquid sample, reagent, or solution for transfer into a sample plate 110A. Liquid-transferring device 105A may include one or more structural components suitable for retaining liquid and for interfacing with a transfer component used to draw liquid from the interior of liquid-transferring device 105A. In some examples, liquid-transferring device 105A may include a pipette body, a pipette reservoir, a syringe barrel, a reagent cartridge, or another type of liquid storage container.

Liquid-transferring device 105A may be configured to operatively couple with a transfer component, such as a pipette tip, dispensing nozzle, or syringe needle, through which liquid may be aspirated from liquid-transferring device 105A and dispensed into sample plate 110A. The dimensions, geometry, and material composition of liquid-transferring device 105A may vary depending on laboratory use cases and liquid handling protocols. For example, liquid-transferring device 105A may include a disposable plastic pipette tip cartridge for use in biological assays or a glass syringe barrel configured for high-precision chemical transfers.

In some embodiments, liquid-transferring device 105A may include identifiable markings, geometric features, or fiducial indicators that facilitate detection of the location and orientation of the transfer component by transfer component pose detector 120A. In certain implementations, liquid-transferring device 105A may be mounted within a fixed enclosure or holder such that its position relative to sensing device 115A is repeatable across multiple liquid transfer operations.

1.10A Sample Plate

Sample plate 110A may be a container configured to receive liquid transferred from liquid-transferring device 105A during a liquid-transferring operation. In some examples, sample plate 110A may include a well of a multi-well plate, a microtube, a vial, or another type of liquid-receiving container commonly used in laboratory environments.

Sample plate 110A may be configured to receive liquid with high positional precision, such that the location of the rim of each reception component is determinable within a coordinate system accessible to system 100. In certain embodiments, sample plate 110A may be secured within a holder, fixture, or enclosure that establishes a known orientation relative to sensing device 115A, thereby enabling accurate geometric mapping of liquid-reception boundaries to the sample plate 110A (e.g., by liquid reception boundary generator 130A).

In some implementations, sample plate 110A may may have one or more receptacle components, where a receptacle component may be an opening or port in the sample plate 110A that is isolated from other reception components and is configured to transfer liquid with a transfer component of a liquid-transferring device 105A. Each receptacle component may, for instance, be a well or a cavity defined by a respective rim. For example, sample plate 110A may include a ninety-six well plate or a three-hundred-eighty-four well plate, where each well serves as a separate reception component for liquid transfer. System 100 may be configured to determine, for each such well, whether transfer component engagement has occurred within the corresponding rim boundary.

1.15A Sensing Device(s)

Sensing device 115A may include one or more imaging systems configured to capture image data of liquid-transferring operations between liquid-transferring device 105A and sample plate 110A. Sensing device 115A may be positioned relative to system 100 such that both a transfer component of liquid-transferring device 105A and a rim of sample plate 110A are within a field of view of sensing device 115A.

In some examples, sensing device 115A may include a depth camera configured to provide depth image data representing distances between the camera and objects in the scene. In other examples, sensing device 115A may include a multi-modal imaging system that combines depth sensing with visible spectrum or infrared imaging. The output of sensing device 115A may include pixel data, three-dimensional point cloud data, or combinations thereof.

Sensing device 115A may be operatively coupled to transfer component pose detector 120A and liquid reception boundary generator 130A and may provide raw or pre-processed image data for detection of transfer component position and orientation, as well as determination of liquid-reception boundaries of sample plate 110A. In certain implementations, sensing device 115A may include one or more calibration features or reference markers that enable accurate alignment of captured image data with a predefined coordinate system of system 100.

In some embodiments, sensing device 115A may be configured to operate at frame rates sufficient to capture successive images of transfer component motion in real time, thereby enabling generation of temporal sequences of engagement states. By capturing image data that reflects both spatial and temporal dynamics of liquid transfer, sensing device 115A provides the input from which system 100 detects transfer component alignment, generates engagement inferences, and outputs engagement statuses.

1.20A Transfer Component Pose Detector

Transfer component pose detector 120A may include a processing module configured to determine a position and orientation of a transfer component associated with liquid-transferring device 105A. Transfer component pose detector 120A may receive image data captured by sensing device 115A and may execute one or more computer vision models, including object pose estimation models, to detect the geometric pose of the transfer component within a three-dimensional coordinate system.

In some examples, transfer component pose detector 120A may employ segmentation algorithms to isolate image regions corresponding to the transfer component from background image data. In other examples, transfer component pose detector 120A may apply machine learning models trained on annotated datasets of transfer component imagery to infer the spatial coordinates of reference points along the transfer component. The output of transfer component pose detector 120A may include translational position data, rotational orientation data, or a combination thereof.

Transfer component pose detector 120A may be operatively coupled with sensing device 115A to receive image inputs and with pointing vector generator 125A to provide detected position and orientation data. By enabling accurate estimation of the transfer component's spatial pose, transfer component pose detector 120A establishes the foundation for generating a pointing vector aligned with a central axis of the transfer component, thereby facilitating subsequent determination of alignment with sample plate 110A.

In some embodiments, transfer component pose detector 120A may perform real-time updates to track dynamic motion of the transfer component during a liquid transfer procedure. In such implementations, transfer component pose detector 120A may continuously update pose estimates across successive frames of image data, enabling system 100 to construct temporal sequences of transfer component movements and to detect transitions between engagement states.

1.25A Pointing Vector Generator

Pointing vector generator 125A may include a processing module configured to generate a pointing vector that extends along a substantially central axis of a transfer component of liquid-transferring device 105A. Pointing vector generator 125A may receive position and orientation data of the transfer component from transfer component pose detector 120A and may compute a mathematical representation of the transfer component's principal axis within a defined coordinate system of system 100.

In some examples, pointing vector generator 125A may perform principal component analysis, singular value decomposition, or eigenvalue decomposition on point cloud data corresponding to the transfer component in order to identify the dominant axis of elongation. In other examples, pointing vector generator 125A may compute the pointing vector directly from pose estimation outputs representing keypoints or fiducial markers located along the transfer component.

Pointing vector generator 125A may be operatively coupled with transfer alignment detector 135A to provide the generated pointing vector for determination of an intersection point with a liquid-reception boundary of sample plate 110A. By establishing a vectorial representation of the transfer component's axis, pointing vector generator 125A enables subsequent determination of whether the transfer component is aligned within a successful liquid transfer position relative to sample plate 110A.

In some embodiments, pointing vector generator 125A may update the pointing vector dynamically across successive frames of image data, thereby enabling system 100 to track continuous motion of the transfer component in real time. Such temporal updates may support generation of engagement durations, detection of approach trajectories, and confirmation of correct alignment prior to liquid dispensing events.

1.30A Liquid Reception Boundary Generator

Liquid reception boundary generator 130A may include a processing module configured to generate a geometric plane extending along a surface of sample plate 110A and to determine, within the plane, a liquid-reception boundary corresponding to a rim of each reception component of sample plate 110A.

Liquid reception boundary generator 130A may receive image data from sensing device 115A and may process the image data to identify a surface of sample plate 110A that serves as a reference plane for locating individual reception components. Once the reference plane is established, liquid reception boundary generator 130A may detect discontinuities, contours, or edge features within the plane to determine the rim of each reception component. In examples where sample plate 110A includes a multi-well plate, liquid reception boundary generator 130A may generate a set of liquid-reception boundaries, each corresponding to a respective reception component in the sample plate.

The liquid-reception boundary for each reception component may be expressed as a geometric structure (e.g., circular, polygonal, or elliptical outline) defined within the reference plane. Liquid reception boundary generator 130A may provide this boundary information to transfer alignment detector 135A for computation of intersection points between pointing vectors generated by pointing vector generator 125A and the boundaries of the reception components.

In some embodiments, liquid reception boundary generator 130A may incorporate calibration information associated with the geometry of sample plate 110A, such as known reception component spacing or fiducial markers positioned along the plate surface, in order to improve accuracy of the plane generation and boundary determination. By generating both a reference plane and corresponding liquid-reception boundaries, liquid reception boundary generator 130A enables system 100 to verify whether transfer component alignment corresponds to an intended reception component of sample plate 110A.

1.35A Transfer Alignment Detector

Transfer alignment detector 135A may include a processing module configured to determine an intersection point between a pointing vector generated by pointing vector generator 125A and a liquid-reception boundary generated by liquid reception boundary generator 130A. Transfer alignment detector 135A may receive as input the pointing vector representing a substantially central axis of a transfer component 107A of liquid-transferring device 105A and the geometric representation of one or more liquid-reception boundaries of sample plate 110A.

In some examples, transfer alignment detector 135A may compute a mathematical intersection between the pointing vector and the reference plane generated by liquid reception boundary generator 130A, and may further evaluate whether the computed intersection point resides within the geometric limits of a liquid-reception boundary. In other examples, transfer alignment detector 135A may determine whether a projection of the pointing vector intersects a region corresponding to the rim of a reception component in two-dimensional image coordinates derived from sensing device 115A.

Transfer alignment detector 135A may be operatively coupled with engagement inference generator 140A and may provide intersection results that indicate whether the transfer component is aligned within a successful liquid transfer position relative to a target reception component. In some embodiments, transfer alignment detector 135A may also compute a proximity measure representing a distance between the pointing vector and the nearest portion of a liquid-reception boundary, thereby providing an additional quantitative input to engagement inference generator 140A.

By establishing whether the pointing vector intersects a valid liquid-reception boundary, transfer alignment detector 135A enables system 100 to differentiate between cases where a transfer component is directed into a correct reception component, directed outside of any reception component, or positioned near a reception component. This determination supports subsequent inference and classification of engagement states, allowing engagement inference generator 140A to generate an engagement inference and engagement status generator 145A to present real-time feedback to a user device 150A.

1.40A Engagement Inference Generator

Engagement inference generator 140A may include a processing module configured to determine, based at least in part on an intersection point provided by transfer alignment detector 135A, whether a transfer component of liquid-transferring device 105A is positioned within a successful liquid transfer position relative to a liquid-reception boundary of sample plate 110A. Engagement inference generator 140A may implement a multi-stage process that refines raw image data into a classification result identifying an engagement inference.

In some examples, engagement inference generator 140A may include a region of interest filter 141A, a projective transformer 142A, and an engagement inference classifier 143A. Region of interest filter 141A may identify a portion of image data corresponding to a region surrounding the transfer component, thereby reducing noise from extraneous image features. Projective transformer 142A may perform a projective transform on the identified region, normalizing the perspective such that the transfer component and liquid-reception boundary are represented in a standardized view suitable for classification. Projective transformer 142A may further format the transformed region into an input structure compatible with machine learning models. Engagement inference classifier 143A may receive the transformed image data and generate an engagement inference indicating whether the transfer component is within the successful liquid transfer position relative to the liquid-reception boundary.

Engagement inference generator 140A may output the engagement inference as a binary, multi-class, or probabilistic result. For instance, the output may indicate an in-position state, an out-of-position state, or an intermediate state representing proximity to the reception component. The engagement inference may further include a confidence score or probability value quantifying certainty of classification.

Engagement inference generator 140A may be operatively coupled with transfer alignment detector 135A to receive intersection information, and with engagement status generator 145A to provide the generated engagement inference. By combining geometric alignment information with classification results derived from localized image analysis, engagement inference generator 140A enables system 100 to produce robust determinations of whether a liquid transfer is occurring within a valid liquid reception boundary, even in scenarios involving uncertain or ambiguous positioning of the transfer component.

1.45A Engagement Status Generator

Engagement status generator 145A may include a processing module configured to generate an engagement status based at least in part on an engagement inference received from engagement inference classifier 143A. Engagement status generator 145A may determine whether a transfer component of liquid-transferring device 105A is in a successful liquid transfer position relative to a liquid-reception boundary of sample plate 110A and may output a corresponding status for presentation on user device 150A.

In some examples, engagement status generator 145A may convert an engagement inference into a discrete status label corresponding to a liquid transfer position category, such as an in-position state, an out-of-position state, or an intermediate state indicating uncertain proximity to the liquid-reception boundary. In other examples, engagement status generator 145A may generate a graphical indicator that encodes a confidence score provided by engagement inference classifier 143A, such as a color-coded marker (e.g., green, yellow, or red) or a numerical value.

Engagement status generator 145A may be operatively coupled with user device 150A to provide real-time feedback to laboratory personnel. In some embodiments, engagement status generator 145A may additionally record engagement statuses with associated timestamps and reception component identifiers in a traceability log, thereby enabling subsequent review of liquid transfer sequences. Engagement status generator 145A may further generate compliance notifications when a detected engagement status deviates from one or more transfer event logic rules stored within system 100.

By transforming raw engagement inferences into actionable engagement statuses, engagement status generator 145A enables system 100 to deliver real-time user guidance, improve reproducibility of laboratory workflows, and provide traceable records of liquid transfer operations.

1.50A User Device

User device 150A may include a computing or display device configured to present engagement statuses generated by engagement status generator 145A to a laboratory operator or automated system. User device 150A may include a display screen, a graphical user interface, and one or more input mechanisms enabling interaction with system 100 during liquid transfer operations.

In some examples, user device 150A may be a portable monitor, tablet, or workstation display positioned near sample plate 110A, allowing laboratory personnel to observe real-time visual indicators of transfer component positioning. In other examples, user device 150A may include a network-connected computing device configured to receive engagement statuses via a communications interface and to display results within a remote monitoring or laboratory information management system.

User device 150A may display engagement statuses as discrete symbols, such as color-coded indicators representing in-position, out-of-position, or intermediate states of the transfer component. User device 150A may additionally provide numerical confidence scores, graphical overlays including bounding boxes or annotations on captured image data, or time-based plots indicating engagement durations. In some embodiments, user device 150A may generate alerts or notifications in response to detection of deviations from transfer event logic rules, enabling immediate corrective action.

In certain implementations, user device 150A may further provide user-selectable controls that trigger functions of system 100, such as initiating an instant replay of captured image data, retrieving traceability logs, or confirming compliance checks. By serving as the interface between system 100 and a human operator, user device 150A enables delivery of actionable information, supports training and validation of laboratory techniques, and facilitates integration of engagement status data into broader experimental workflows.

2.00 Method for System for Image-Based Tracking of a Liquid Transferring Operation As shown in FIG. 2, a method 200 for image-based tracking of a liquid transferring operation may include obtaining image data from a liquid-transferring operation between a liquid-transferring device and a sample plate S210; detecting a position and orientation of a transfer component of the liquid-transferring device S220; generating a pointing vector extending along a substantially central axis of the transfer component S230; determining a liquid-reception boundary representing a rim of a reception component of the sample plate S240; identifying an intersection point of the pointing vector with the liquid-reception boundary S250; detecting whether the transfer component is within a successful liquid transfer position of the rim of the reception component S260, where the detecting includes: identifying a portion of the image data representing a region around the transfer component S260A, performing a projective transform on the identified portion of the image data S260B, providing the transformed portion of the image data to an engagement inference classifier 260C, and outputting, by the engagement inference classifier an engagement inference S260D; and outputting engagement status indicating whether the transfer component is within the successful liquid transfer position S270.

2.10 Obtain Image Data from a Liquid-Transferring Operation Between a Liquid-Transferring Device and a Sample Plate S210, which includes obtaining image data from a liquid-transferring operation between a liquid-transferring device and a sample plate, may function to capture visual and/or depth-based representations of liquid handling events for subsequent analysis by system 100. In one or more embodiments, image data may be captured by sensing device 115A and may represent spatial and temporal characteristics of a transfer component of liquid-transferring device 105A as it approaches, engages with, and withdraws from sample plate 110A.

As referred to herein, image data may include two-dimensional image frames, three-dimensional point cloud data, pixel depth values, or combinations thereof generated by sensing device 115A. Image data may further include continuous frame sequences recorded over time such that system 100 may detect and evaluate dynamic movements of the transfer component during the liquid-transferring operation.

A liquid-transferring operation may include aspirating liquid from liquid-transferring device 105A and dispensing the liquid into sample plate 110A. In some examples, a liquid-transferring operation may further include approach and alignment motions of a transfer component relative to a rim of a reception component of sample plate 110A, as well as post-dispense withdrawal motions of the transfer component. It should be noted that there may be examples where a liquid-transferring operation may include liquid-transferring device 105A receiving liquid from sample plate 110A.

A liquid-transferring device may be any container configured to supply liquid for transfer. In one or more embodiments, liquid-transferring device 105A may be a pipette, syringe, cartridge, or reagent reservoir. Liquid-transferring device 105A may further include a transfer component such as a pipette tip, dispensing nozzle, or syringe needle through which liquid may be withdrawn and dispensed.

A sample plate may be any container configured to receive liquid transferred from liquid-transferring device 105A. In one or more embodiments, sample plate 110A may comprise a multi-well plate, a microtube, a vial, or a similar container. Sample plate 110A may include one or more reception components with rims configured for liquid transfer.

In operation, obtaining image data may include positioning sensing device 115A such that both liquid-transferring device 105A and sample plate 110A are within a field of view. In one or more embodiments, sensing device 115A may include one or more cameras mounted above a workbench to capture top-down views of reception components, or mounted at side-facing angles to capture entry of a transfer component into a reception component. In some implementations, multiple cameras may be employed simultaneously to capture both rim boundaries and transfer component orientation.

Sensing device 115A may include a depth camera configured to capture per-pixel distance values representing the geometry of both the transfer component and the rim of sample plate 110A. Depth sensing may be particularly useful when imaging opaque or black plastic plates where rim boundaries are not easily distinguished in RGB image data. Alternatively, or additionally, sensing device 115A may comprise a stereo vision system, a structured light scanner, or an RGB-D camera capable of generating both color and depth modalities of image data.

In certain implementations, additional hardware may enhance capture quality. Sensing device 115A may be mounted on a movable track enabling repositioning across multiple sample plates and may include adjustable focus and rotatable mounts. Illumination subsystems may include LED sources, incandescent bulbs, or monochromatic light emitters configured to increase contrast for rim or transfer component detection. Backgrounds may be selected to improve segmentation accuracy, such as using featureless white or black surfaces, or patterned surfaces designed to aid edge extraction. Fiducial markers such as QR codes, gridlines, or identifiers may provide calibration anchors for alignment.

In some embodiments, image data acquisition may further include calibration of sensing device 115A relative to sample plate 110A such that each reception component of a sample plate is mapped to a known coordinate system. Continuous frame sequences may be acquired at a rate sufficient to permit temporal tracking of transfer component motion, including entry times, exit times, and durations (e.g., dwell times). In certain cases, operators may initiate recording or cease recording via microphone input or voice command.

In a non-limiting example, as depicted with reference to FIG. 1A, liquid transfer detection system 101A may obtain image data, captured by at least one sensing device 115A, from a liquid-transferring operation 102A between a liquid-transferring device 105A and a sample plate 112A.

2.20 Detect a Position and Orientation of a Transfer Component of the Liquid-Transferring Device S220, which includes detecting a position and an orientation of a transfer component of liquid-transferring device 105A based at least in part on an input of image data into one or more object pose estimation models, may function to determine the spatial pose of the transfer component during a liquid-transferring operation. In one or more embodiments, one or more processors may execute a computer vision model that processes image data captured by sensing device 115A to estimate the position and orientation of the transfer component.

As referred to herein, a computer vision model may refer to a software-implemented or hardware-accelerated algorithm configured to analyze image data for purposes of detection, localization, and pose estimation. In one or more embodiments, the computer vision model may employ segmentation techniques to partition captured image frames into regions corresponding to distinct objects. Segmentation may isolate liquid-transferring device 105A from background features and other laboratory elements.

The position of a transfer component may refer to spatial coordinates of the transfer component relative to a predefined coordinate system of system 100. In one or more embodiments, the position may be defined by the (x, y, z) coordinates of the transfer component expressed in an image space derived from sensing device 115A.

The orientation of a transfer component may include angular values or directional parameters derived from alignment of the transfer component, which provides the geometric axis along which the transfer component extends. In one or more embodiments, the orientation may be represented as Euler angles, quaternions, or direction cosines describing the alignment of liquid-transferring device 105A.

Object pose estimation models may include one or more models trained or configured to output both position and orientation of detected objects. In one or more embodiments, pose estimation may occur in a two-stage process. First, the body of liquid-transferring device 105A may be detected in image data and enclosed in a bounding box. Second, refinement may be performed within the bounding box to identify the transfer component.

In certain embodiments, pose estimation may incorporate temporal analysis across successive frames of image data. Successive frame analysis may track motion paths of the transfer component as it approaches and engages a reception component, and temporal smoothing may be applied to reduce jitter. By reconstructing trajectories across multiple frames, the system may characterize approach motions, dwell durations, and withdrawal events with high temporal resolution.

Accordingly, S220 may function to provide robust and real-time determination of transfer component spatial pose by detecting the liquid-transferring device, refining detection to the transfer component, and applying object pose estimation models. At least one technical advantage of S220 includes enabling accurate and continuous tracking of both position and orientation, thereby establishing reliable input for pointing vector generation in S230.

In a non-limiting example, as depicted with reference to FIG. 1, transfer component pose detector 120A may receive image data from sensing device(s) 115A and may detect, by one or more processors executing a computer vision model, a position and orientation of a transfer component 107A of the liquid-transferring device 105A based on an input of the image data into one or more object pose estimation models. Transfer component pose detector 120A may then provide transfer component pose information including the detected position and orientation to pointing vector generator 125A.

Figure 3:
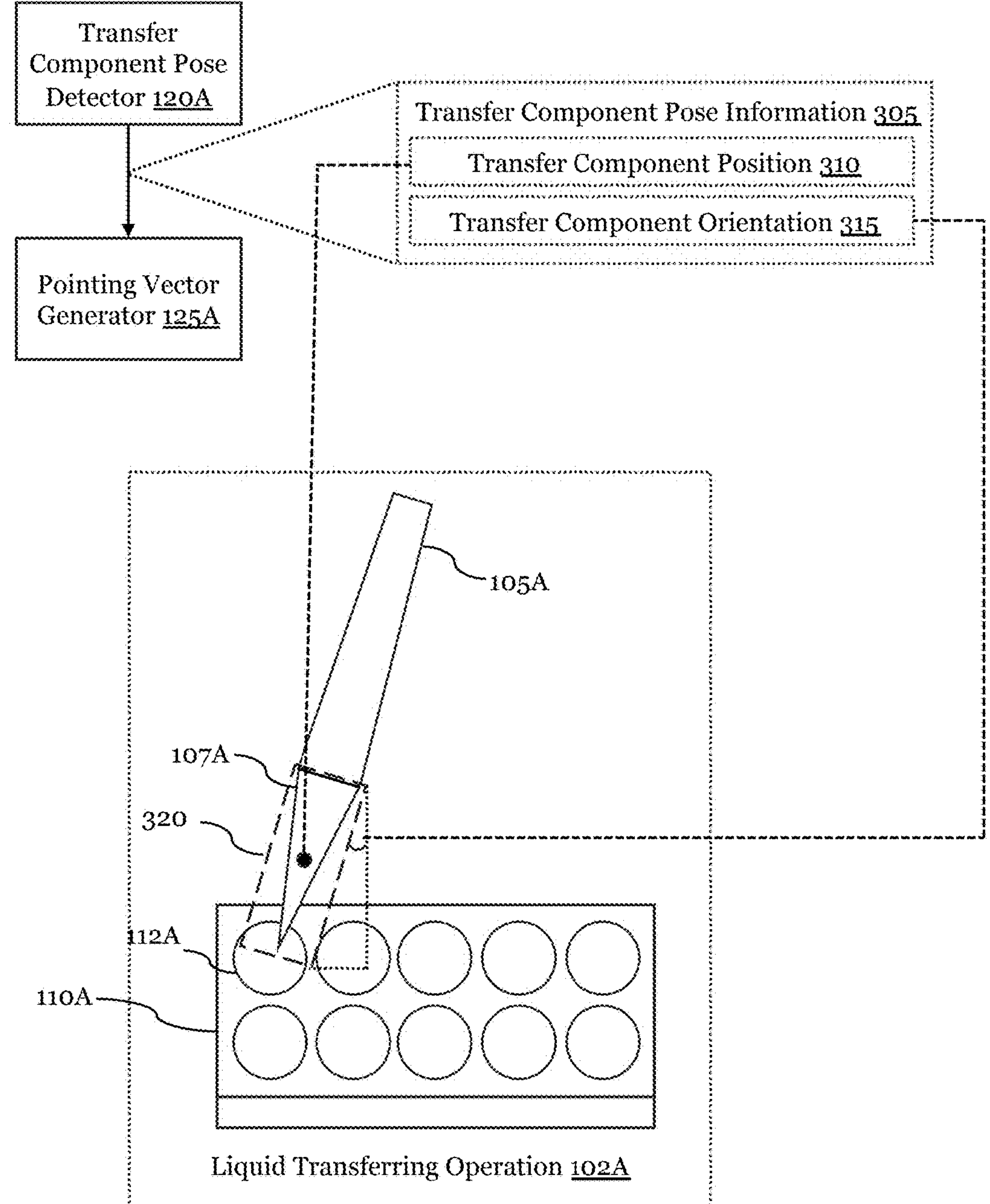
FIG. 3 illustrates an example transfer component pose detection procedure 300 in accordance with one or more embodiments of the present application.

A non-limiting example of transfer component pose information is depicted with reference to FIG. 3. For instance, transfer component pose detector 120A may provide transfer component pose information 305 that includes a transfer component position 310 and a transfer component orientation 315 to pointing vector generator 125A. In some examples, the transfer component position 310 and the transfer component orientation 315 may correspond to a position and orientation of a bounding box 320 around the transfer component 107A.

Device-Level Pose Detection for Transfer Component Estimation

S220 may further include detecting a position and an orientation of a liquid-transferring device, which functions to refine detection of a transfer component by incorporating geometric and positional information associated with the entire liquid-transferring device. In one or more embodiments, such techniques may function to improve accuracy of transfer component pose estimation by leveraging both device-level and component-level characteristics.

The geometry of the liquid-transferring device may include physical dimensions, shapes, and contours of the device body and its attached transfer component. Geometry may be represented by stored design parameters (e.g., tip length, body taper, or nozzle shape), template models, or previously learned shape descriptors used to constrain pose estimation.

Accordingly, in operation, detecting a position and an orientation of the liquid-transferring device may include applying one or more object detection models to identify the device body within captured image data. Once the body of the liquid-transferring device is detected, bounding boxes or segmentation masks may be generated, and edges may be analyzed to identify device contours. The detected body may provide global position and orientation values that inform transfer component localization.

In one or more embodiments, detecting a position and an orientation of a transfer component may be based at least in part on the detected device pose and the known geometry of the device. For example, if the device orientation is determined to be vertical, the transfer component may be located along a central axis extending downward from the body. In other embodiments, geometric models may constrain candidate locations of the transfer component tip, enabling faster and more accurate refinement of tip position and orientation.

2.30 Generate a Pointing Vector Extending Along a Substantially Central Axis of the Transfer Component

S230, which includes generating a pointing vector extending along a substantially central axis of a transfer component based on a detected position and a detected orientation of the transfer component, may function to provide a directional representation of liquid-transferring device 105A during a liquid-transferring operation. In one or more embodiments, one or more processors of system 100 may generate the pointing vector using transfer component pose information obtained from S220.

As referred to herein, a pointing vector may refer to a directional vector defined within a coordinate system of system 100 that represents the orientation of a transfer component relative to its liquid-transferring device. In one or more embodiments, the pointing vector may originate at the detected position of the transfer component and extend outward along the axis defined by the orientation of the liquid-transferring device.

A substantially central axis may refer to a geometric axis passing longitudinally through the liquid-transferring device 105A and through the transfer component. In one or more embodiments, the substantially central axis may be derived from bounding box or segmentation outputs generated in S220 and refined based on edge contours of the liquid-transferring device. The central axis may be approximated by fitting a line or cylindrical geometry through the elongated shape of the liquid-transferring device, ensuring accurate alignment of the pointing vector with the actual physical orientation of the liquid-transferring device.

In operation, generating the pointing vector may include combining the detected position and orientation of the transfer component. In some embodiments, geometric fitting techniques such as singular value decomposition or eigenvalue decomposition may be applied to three-dimensional point cloud data associated with the liquid-transferring device to determine its dominant axis of elongation. The resulting axis may define the direction of the pointing vector, while the detected position of the transfer component may serve as its origin.

In certain implementations, the pointing vector may be extended through the spatial coordinate system of sample plate 110A to determine the direction in which the transfer component is aimed. The pointing vector may be updated dynamically across successive frames to capture real-time changes in trajectory as the transfer component approaches, engages, or withdraws from a rim of a reception component. Such continuous tracking may be used to predict where liquid will be dispensed if the liquid-transferring device is actuated.

Figure 4:
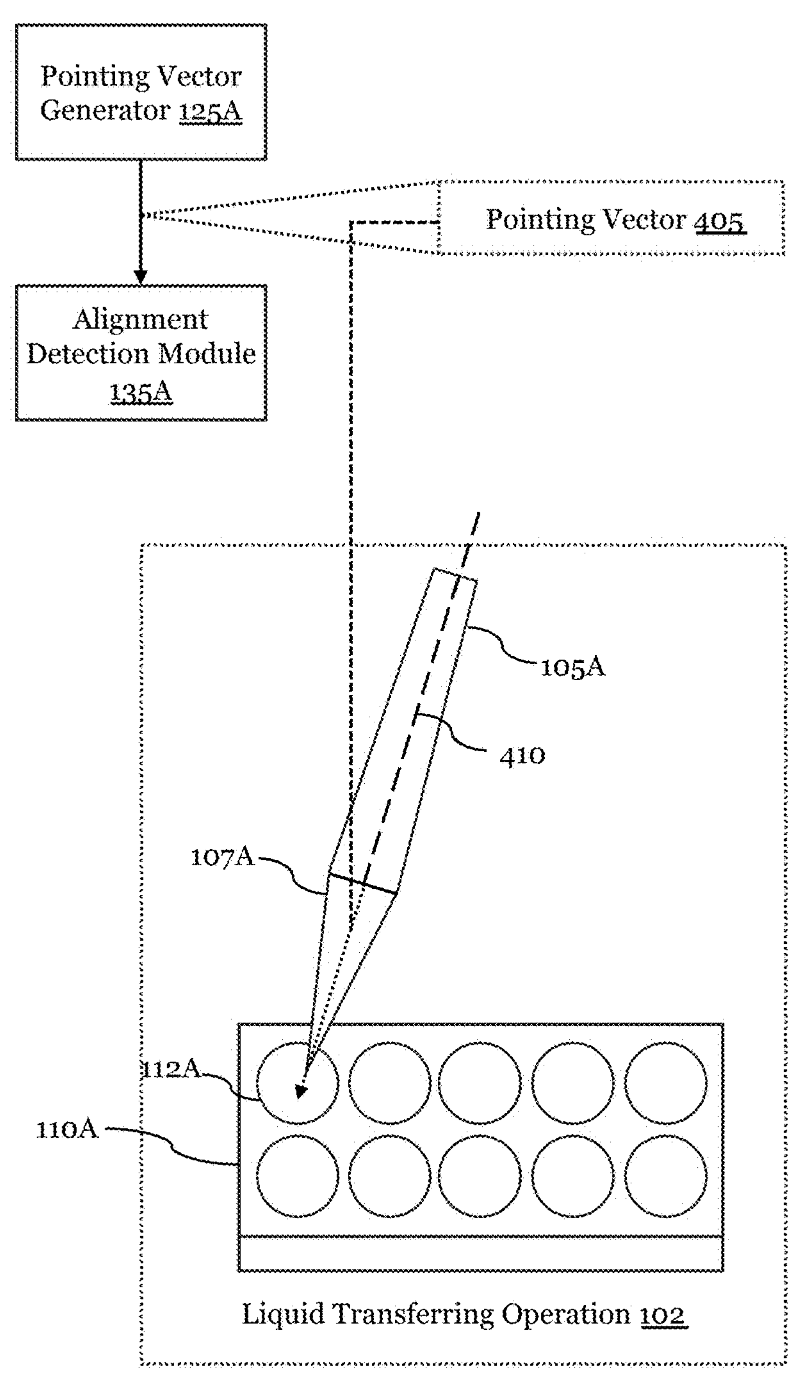
FIG. 4 illustrates an example pointing vector generation procedure 400 in accordance with one or more embodiments of the present application.

In a non-limiting example, as described with reference to FIG. 4, pointing vector generator 125A may receive the transfer component pose information from transfer component pose detector 120A and may generate, by one or more processors a pointing vector 405 extending along a substantially central axis 410 of the transfer component 107A based on the detected position (e.g., transfer component position 310 of FIG. 3) and the detected orientation (e.g., transfer component orientation 315 of FIG. 3) of the transfer component 107A.

2.40 Determine a Liquid-Reception Boundary Representing a Rim of a Reception Component of the Sample Plate S240, which includes determining a liquid-reception boundary representing a rim of a reception component of sample plate 110A, may function to define the geometric limits within which a transfer component of liquid-transferring device 105A may successfully deliver liquid during a liquid-transferring operation. In one or more embodiments, one or more processors of system 100 may generate a reference plane corresponding to a surface of sample plate 110A and, within that plane, identify geometric structures that represent liquid-reception boundaries of one or more reception components.

As referred to herein, a liquid-reception boundary may refer to a two-dimensional or three-dimensional geometric representation of a rim or edge defining an opening of a reception component. In one or more embodiments, a liquid-reception boundary may be expressed as a closed curve, such as circular, elliptical, or polygonal, mapped into the reference plane of sample plate 110A.

A reception component may refer to an individual cavity, well, or container unit within sample plate 110A that is configured to receive liquid from liquid-transferring device 105A. In some examples, a reception component may correspond to a well of a multi-well plate. Multi-well plates may include standardized formats of four, eight, sixteen, twenty-four, forty-eight, ninety-six, or three-hundred-eighty-four wells, each with rims defining individual liquid-reception boundaries.

A rim of a reception component may refer to a physical edge surrounding an opening of a reception component of sample plate 110A. In one or more embodiments, the rim may define the transition point at which liquid enters the reception component. The rim may further correspond to a measurable discontinuity in height or depth relative to a surrounding surface of sample plate 110A.

In operation, determining the liquid-reception boundary may include generating a geometric plane extending along the upper surface of sample plate 110A based on image data obtained by sensing device 115A. Within that plane, processors may apply edge detection, contour analysis, or surface-fitting algorithms to identify rim boundaries. Depth imaging may be particularly effective for opaque or black plastic plates, where rim edges are less visible in standard RGB data. Stereo vision or RGB-D cameras may be used to capture per-pixel depth values that expose openings of reception components as depth discontinuities.

In some embodiments, liquid-reception boundaries may be further validated using calibration data that defines expected reception component spacing and dimensions of the sample plate. Fiducial markers or identifiers placed on the sample plate may serve as reference anchors for alignment correction, ensuring that rim detection results are consistent with the physical geometry of the plate.

Figure 5:
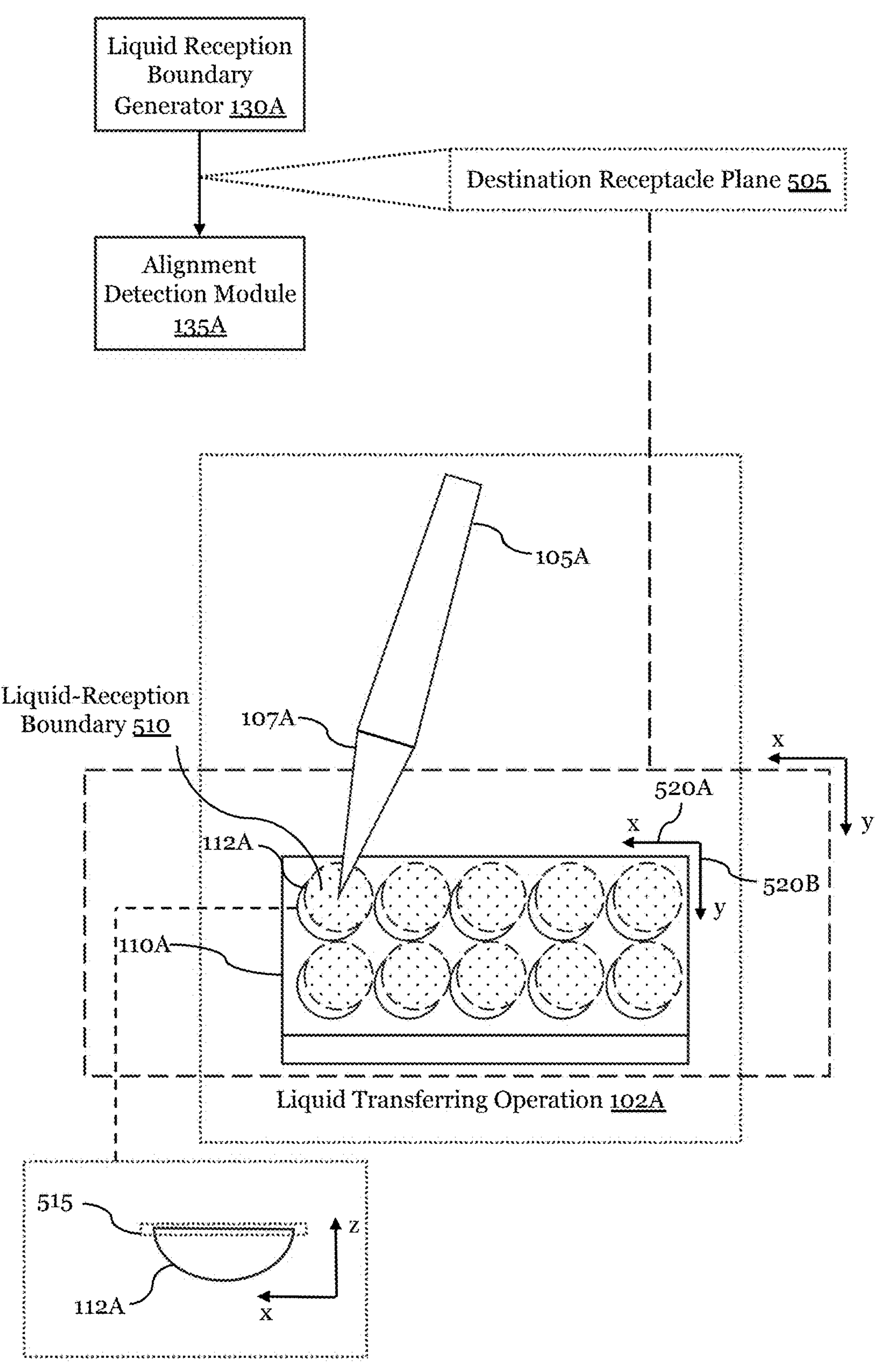
FIG. 5 illustrates an example liquid reception boundary generation procedure 500 in accordance with one or more embodiments of the present application.

In a non-limiting example, as described with reference to FIG. 5, liquid reception boundary generator 130A may determine, by one or more processors, a liquid-reception boundary 510 representing a rim 515 of a reception component 112A and may provide an indication of the liquid-reception boundary 510 to alignment detection module 135A.

Liquid Reception Boundaries Determination when a Sample Plate has Multiple Reception Components In some embodiments, S240 may further include determining liquid-reception boundaries for a set of multiple reception components arranged in a grid or array. In one or more embodiments, the sample plate may include reception components organized along a first direction and a second direction parallel to the first direction. A plane may be generated extending across both directions to represent the top surface of the sample plate, and within the plane, each reception component may be associated with a respective liquid-reception boundary corresponding to its rim geometry.

In operation, one or more processors may identify the position of the sample plate within the imaging field based on fiducial markers, enclosure geometry, or calibration data. Once the plate position is established, liquid-reception boundaries may be determined for each reception component by projecting known sample plate geometry onto the plane or by applying edge-detection techniques to captured image data.

In certain implementations, determining liquid-reception boundaries for a set of reception components may further include associating each boundary with a unique position identifier, such as a row and column coordinate. For example, in a 96-well plate, reception components may be identified as A1 through H12, and each identifier may be mapped to a corresponding boundary within the plane.

It should be noted that there may be examples in which no plane construction is performed. For instance, the sample plate may have a geometry predetermined by the liquid transfer detection system 101A. Additionally, the liquid transfer detection system 101A may determine a location of each corner of the sample plate prior to engagement of a reception component (e.g., due to the sample plate being in a fixed position). Accordingly, liquid transfer detection system 101A may determine where each liquid reception boundary is based on the predetermined geometry (which may have a predeterminable reception component size and spacing) and the determined location of each corner of the sample plate. In such examples, each liquid reception boundary may still each encompass a respective area along a plane. However, explicit calculation of the plane may be omitted.

In a non-limiting example, as described with reference to FIG. 5, a sample plate 110A may include a set of reception components 112A arranged in a first direction 520A and a second direction 520B parallel to the first direction 520A. Additionally, liquid reception boundary generator 130A may generate, by one or more processors, a sample plate plane 505 extending along the first direction 520A and the second direction 520B and may determine, within the sample plate plane 505, a respective liquid reception boundary 510 for each reception component 112A of the set of reception components 112A. In some examples, identifying that an intersection point as described with reference to S250 is within a liquid reception boundary 510 includes identifying that the intersection point is on a portion of the sample plate plane 505 occupied by the liquid reception boundary 510.

2.50 Identify an Intersection Point of the Pointing Vector with the Liquid-Reception Boundary S250, which includes identifying an intersection point of the pointing vector and the liquid-reception boundary, may function to determine whether a transfer component of liquid-transferring device 105A is geometrically aligned with a rim of a reception component of sample plate 110A. In one or more embodiments, one or more processors of system 100 may compute a point of intersection between the pointing vector generated in S230 and the liquid-reception boundary determined in S240.

As referred to herein, an intersection point may refer to a spatial coordinate at which a directional line or vector representing the transfer component axis crosses a geometric representation of a liquid-reception boundary. In one or more embodiments, the intersection point may be expressed as a three-dimensional coordinate within a calibrated coordinate system of system 100. In other embodiments, the intersection point may be expressed as a two-dimensional projection of the pointing vector into the reference plane of sample plate 110A.

In operation, identifying the intersection point may include projecting the pointing vector, originating from the detected position of the transfer component tip, into the reference plane generated in S240. A candidate intersection may be computed as the crossing of the pointing vector with the plane. Processors may then evaluate whether the candidate intersection lies within the closed boundary curve representing a rim.

In some embodiments, linear equations defining the pointing vector and the receptacle plane may be solved to compute the intersection point directly. In other embodiments, a ray-casting technique may be used, wherein the pointing vector is extended forward through the image space or point cloud until it reaches the receptacle plane. Bounding boxes and segmentation masks generated in S220 and S240 may be applied as constraints to ensure that only intersections occurring within valid receptacle regions are considered.

In certain implementations, distances between the intersection point and the closest edge of a rim may be calculated to refine alignment classification. If the intersection point lies well within a rim boundary, the trajectory may be classified as in-rim. If the intersection lies outside the rim boundary, the trajectory may be classified as out-of-rim. If the intersection point falls close to a rim edge within a predefined margin, the trajectory may be classified as near-rim, representing an intermediate state.

Accordingly, S250 may function to provide a quantitative geometric analysis of whether a transfer component trajectory intersects with a valid liquid-reception boundary. S250 may enable real-time distinction between in-reception-component, out-of-reception-component, and near-reception-component alignment states based on precise intersection analysis, thereby improving accuracy of engagement inference in S260 and reducing misalignment errors in liquid transferring operations.

In examples in which a sample plate has multiple reception components, the intersection point may be used to determine which reception component the transfer component is aligned with (e.g., pointing towards). For instance, if the pointing vector intersects with a first liquid reception boundary of a first reception component, liquid transfer detection system 101A may determine that the first reception component is a candidate reception component with which the transfer component is aligned. Alternatively, if the pointing vector intersects with a second liquid reception boundary of a second reception component, liquid transfer detection system 101A may determine that the second reception component is a candidate reception component with which the transfer component is aligned.

Figure 6:
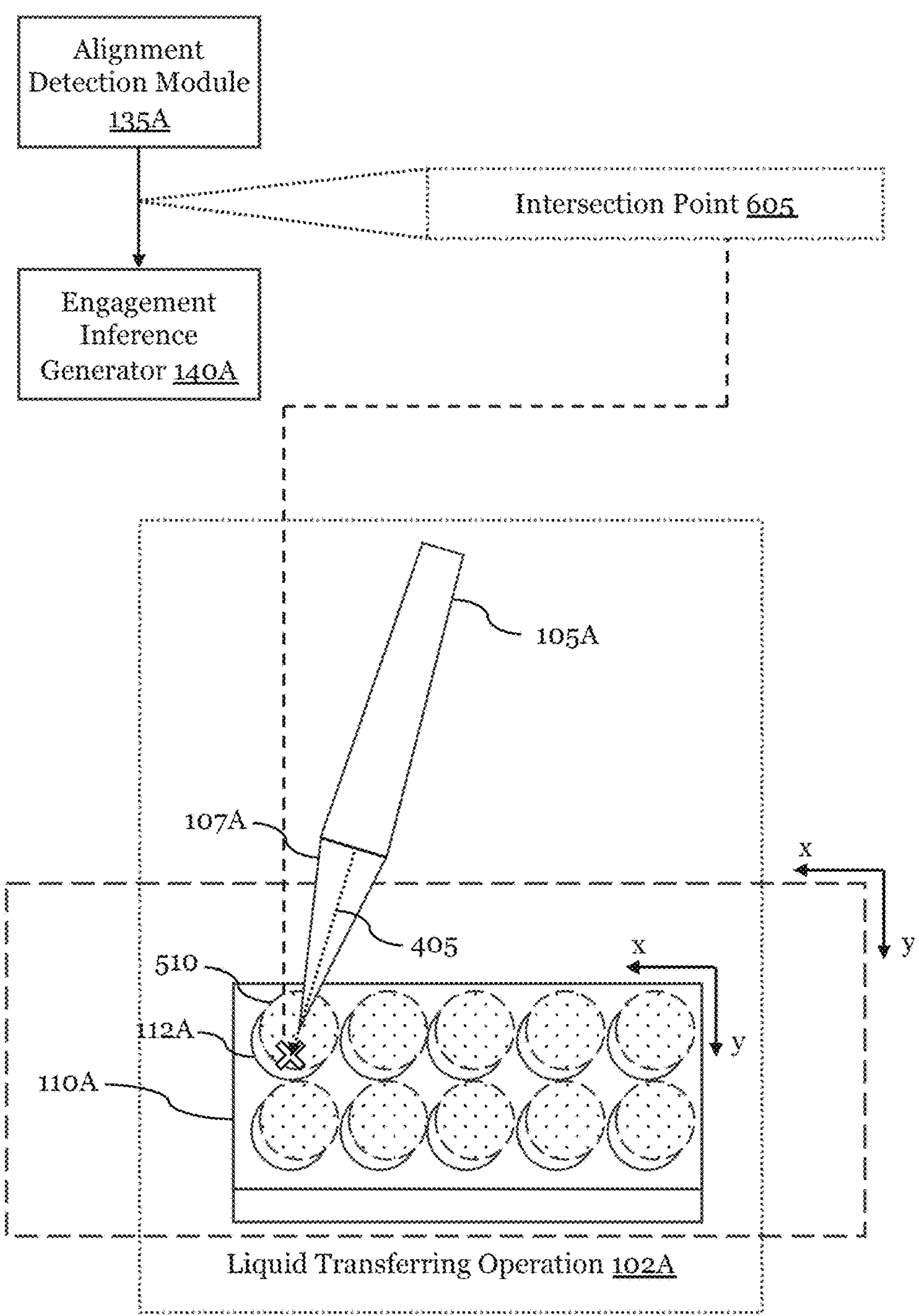
FIG. 6 illustrates an example intersection point identification procedure 600 in accordance with one or more embodiments of the present application.

In a non-limiting example, as described with reference to FIG. 6, alignment detection module 135A may identify, by one or more processors, an intersection point 605 of the pointing vector 405 and the liquid-reception boundary 510 and may provide an indication of the intersection point 605 to engagement inference generator 140A.

2.60 Detect Whether the Transfer Component is within a Successful Liquid Transfer Position of the Rim of the Reception Component S260, which includes detecting whether the transfer component is within a successful liquid transfer position of the rim of the reception component, may function to determine whether a spatial pose of liquid-transferring device 105A allows for accurate liquid delivery into sample plate 110A. In one or more embodiments, one or more processors of system 100 may analyze image data in conjunction with the intersection point identified in S250 to classify the transfer component as being in, out, or near a valid liquid transfer position.

A successful liquid transfer position may refer to a spatial configuration in which the detected transfer component is located within a region bounded by the rim of a reception component of sample plate 110A and in which the detected orientation of liquid-transferring device 105A is directed toward the intersection point computed in S250. This configuration may correspond to conditions under which actuation of liquid-transferring device 105A results in fluid being reliably dispensed into the intended reception component.

In operation, detecting whether the transfer component is within the successful liquid transfer position may include a multi-stage process performed by engagement inference generator 140A. The process may include generating a region of interest around the transfer component (e.g., S260A), performing a projective transform on that region to normalize perspective (e.g., S260B), preparing and supplying the transformed data to a classifier (e.g., 260C), and obtaining an engagement inference from the classifier (e.g., S260D).

In one or more embodiments, an engagement inference may refer to a categorical or probabilistic determination across multiple liquid transfer position categories. For example, a classifier may output likelihoods corresponding to multiple liquid transfer position categories. Engagement inference may then be determined as the category associated with the highest likelihood.

In some implementations, classifiers may be trained using annotated video datasets that include examples of transfer components correctly within a reception component, outside of a reception component, or positioned near but not within a reception component. Temporal training sequences may also be used, allowing the model to recognize motion-based patterns such as gradual entry or angled withdrawal. Engagement inference may therefore incorporate both single-frame and multi-frame evaluations.

In certain embodiments, engagement inference may further include detection of error conditions associated with the liquid transfer process. Such error conditions may include the presence of hanging droplets forming at the transfer component tip, bubbles appearing in aspirated liquid, improper plunger depression, or loose or incorrect tip attachment. For liquid-transferring devices with multiple transfer components (e.g., multi-channel pipettes), engagement inference may include identifying misalignments across multiple reception components or failure of one or more transfer components to properly engage.

Accordingly, S260 may function to provide comprehensive inference of liquid transfer engagement states by integrating spatial alignment analysis and probabilistic classification. S260 may enable reliable real-time assessment of positioning of transfer components, thereby reducing undetected errors.

Figure 8:
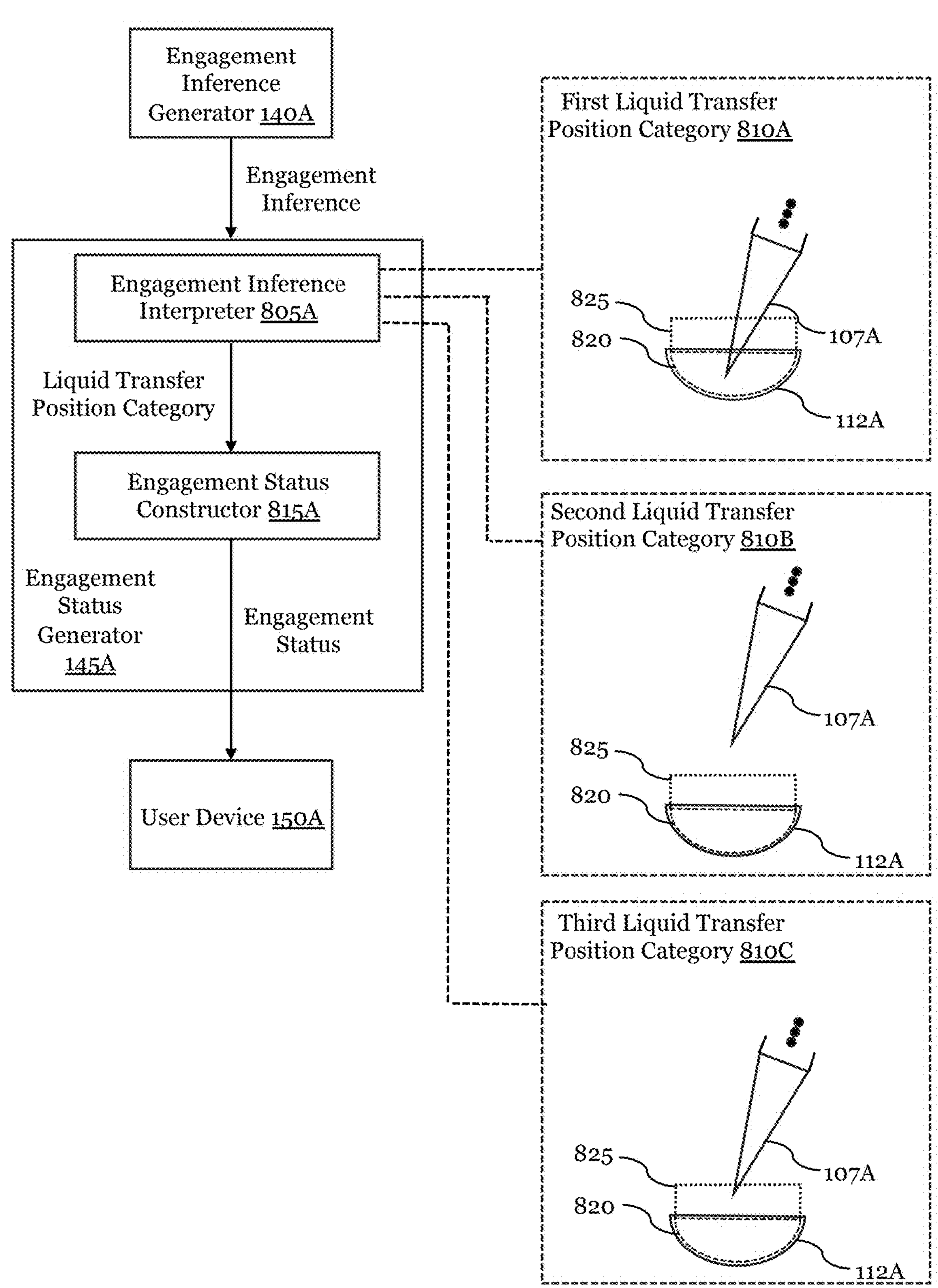
FIG. 8 illustrates an example engagement inference interpretation procedure 800 in accordance with one or more embodiments of the present application.

In a non-limiting example, as described with reference to FIG. 8, engagement inference generator 140A may detect, by one or more processors and based on the identified intersection point (e.g., intersection point 605 of FIG. 6), whether the transfer component 107A is within a successful liquid transfer position 820 of the rim of the reception component 112A.

2.60A Identify a Portion of the Image Data Representing a Region Around the Transfer Component S260A, which includes identifying a portion of the image data representing a region around the transfer component, may function to isolate a localized subset of image data that is most relevant for subsequent perspective normalization and classification. In one or more embodiments, one or more processors of system 100 may filter image data captured by sensing device 115A to generate a cropped or masked representation that emphasizes a tip of the transfer component and its immediate surroundings.

As referred to herein, a region may refer to a defined subset of an image space or point cloud space that encompasses one or more objects of interest. In the context of liquid transfer monitoring, a region may be defined around the transfer component of liquid-transferring device 105A such that the region includes both a liquid dispensing tip of the transfer component and spatial context associated with a rim of a reception component of sample plate 110A.

Accordingly, S260A may function to generate a region of interest that provides localized but contextually sufficient image data for projective transformation and classification. S260A may improve computational efficiency by constraining classifier inputs to relevant regions.

In a non-limiting example, as described with reference to FIGS. 1B and 7, a region of interest filter 141A may receive an indication of an intersection point (e.g., intersection point 605 of FIG. 6) and image data (e.g., image data received from at least one sensing device 115A of FIG. 1A) and may identify a portion of the image data representing a region 705 around the transfer component 107A. Region of interest filter 141A may then provide the identified portion of the image data to projective transformer 142A.

2.60B Perform a Projective Transform on the Identified Portion of the Image Data S260B, which includes performing a projective transform on the identified portion of the image data, may function to normalize perspective distortions and reorient localized image content into a standardized view suitable for classification. In one or more embodiments, one or more processors of system 100 may apply geometric transformations to the region of interest generated in S260A in order to align the transfer component tip and the rim of a reception component into a consistent reference frame.

As referred to herein, a projective transform may refer to a mathematical mapping that relates points in one image plane to corresponding points in another plane through a homography or perspective transformation matrix. In one or more embodiments, a projective transform may re-map an oblique or angled view of the transfer component region into an orthogonal or top-down view, thereby reducing distortions introduced by cameran orientation, operator variability, or receptacle geometry.

In operation, performing a projective transform may include computing a transformation matrix from feature correspondences between the captured region of interest and a defined reference plane associated with sample plate 110A. Rim boundaries identified in S240 may provide anchor points for homography computation, while the transfer component tip may define a local axis that is aligned during transformation. Depth data captured by sensing device 115A, such as from stereo or RGB-D cameras, may further refine the transformation by enabling three-dimensional reprojection of the region of interest into a normalized coordinate system.

In some embodiments, multiple candidate projective transforms may be generated for a given region of interest, and consistency metrics may be applied to select the transform that produces the most accurate alignment between the transfer component axis and the rim boundary. For example, an optimal transform may minimize projection error between the extended pointing vector and a detected rim curve. In other embodiments, interpolation of pixel or depth values may be used during transformation to preserve local detail, ensuring that small features such as droplets or tip misalignments remain visible to the classifier.

In certain implementations, projective transforms may be adapted for challenging imaging conditions, such as opaque or black multi-well plates, where rim contrast is limited. By incorporating depth discontinuities alongside image-based contours, the projective transform may produce a normalized region that maintains sufficient accuracy for downstream classification even in low-contrast scenarios.

Accordingly, S260B may function to generate a standardized and geometrically consistent view of the transfer component relative to receptacle boundaries. S260B may enable reliable preparation of image data for classification across varied imaging conditions, thereby improving the robustness and accuracy of engagement inference in S260D.

Figure 7:
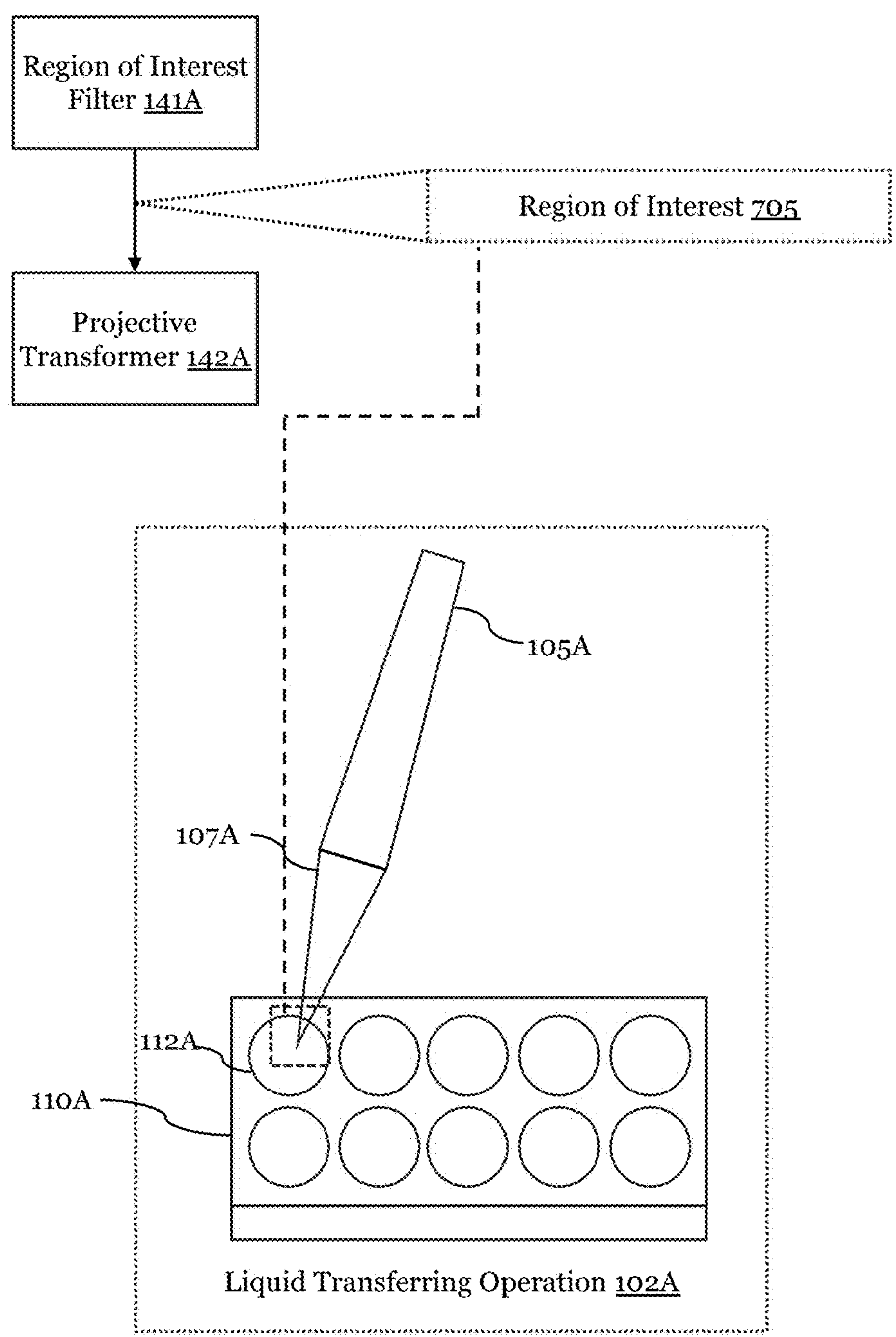
FIG. 7 illustrates an example region of interest filter procedure 700 in accordance with one or more embodiments of the present application.

In a non-limiting example, as described with reference to FIG. 1B, a projective transformer 142A may perform a projective transform on the identified portion of the image data (e.g., corresponding to region 705 as depicted in FIG. 7).

2.60C Provide the Transformed Portion of the Image Data to an Engagement Inference Classifier S260C, which includes providing the transformed portion of the image data to an engagement inference classifier, may function to prepare and deliver the normalized region of interest generated in S260B into a format suitable for classification. In one or more embodiments, one or more processors of system 100 may resize, normalize, or otherwise pre-process the transformed image data to meet the input requirements of a classifier configured to evaluate transfer component alignment.

As referred to herein, an engagement inference classifier may refer to a machine learning model, statistical model, or rule-based algorithm trained to classify positional states of transfer components relative to rims of reception components. Preparing data for such a classifier may include converting pixel values or depth values into standardized ranges, resampling images to fixed resolutions, or encoding the data as feature vectors or tensors suitable for neural network processing.

In operation, supplying the transformed data to the classifier may further include batching multiple successive frames of transformed regions, enabling temporal modeling of transfer component motion. Data augmentation methods such as random rotations, scaling, or intensity variations may be applied to increase classifier robustness under variable laboratory conditions.

In a non-limiting example, as described with reference to FIG. 1B, projective transformer 142A may provide the transformed portion of the image data to an engagement inference classifier 143A. It should be noted that there may be examples where region of interest filter 141A may provide an untransformed portion of the image data to engagement-inference classifier 143A (e.g., no projective transformation may be performed). Additionally, or alternatively, background subtraction may be performed on the region of interest to enable engagement-inference classifier 143A to generate a more accurate engagement inference.

2.60D Output, by the Engagement Inference Classifier, an Engagement Inference

S260D, which includes outputting, by the engagement inference classifier, an engagement inference indicating whether the position and the orientation of the transfer component is within the successful liquid transfer position relative to the rim of the reception component, may function to classify the transfer component's pose during liquid handling. In one or more embodiments, the classifier may generate either categorical outputs, probabilistic outputs, or a combination thereof.

An engagement inference may refer to a classification result indicating whether the transfer component is in a reception component, out of a reception component, or near a reception component (i.e., near-boundary). In some embodiments, the classifier may output likelihood values across these categories, with the engagement inference corresponding to the most likely category. In other embodiments, confidence thresholds may be used to define intermediate states, such as near-boundary, when probabilities fall between predefined ranges.

Accordingly, S260D may function to transform perspective-normalized image data into actionable engagement inferences by applying trained classifiers. 260D may enable detection of liquid transfer position states and/or liquid handling errors in real time, providing probabilistic confidence measures and traceable logs that increase reliability and reproducibility of laboratory liquid transfer operations.

In a non-limiting example, as described with reference to FIG. 1B, engagement inference classifier 143A may output an engagement inference indicating whether the position (e.g., transfer component position 310 as depicted in FIG. 3) and the orientation (e.g., transfer component orientation 315 as depicted in FIG. 3) of the transfer component 107A is within the successful liquid transfer position (e.g., successful liquid transfer position 820) relative to the rim of the reception component.

Multi-Class Engagement Inference

S260D, which includes outputting, by the engagement inference classifier, an engagement inference indicating whether the position and the orientation of the transfer component is within the successful liquid transfer position relative to the rim of the reception component, may function to classify transfer component pose and operational state during liquid handling. In one or more embodiments, the classifier may generate categorical outputs, probabilistic outputs, or a combination thereof.

In operation, the engagement inference may indicate a likelihood distribution across multiple liquid transfer position categories. In one or more embodiments, the categories may include a first liquid transfer position category representing an in-reception-component state, a second liquid transfer position category representing an out-of-reception-component state, and a third liquid transfer position category representing a near-reception-component (i.e., near boundary) state. The near-boundary state may correspond to a configuration in which the transfer component is proximate to, but not definitively within, the rim boundary. This intermediate classification may provide additional traceability in laboratory workflows by identifying ambiguous or low-confidence trajectories that could result in contamination or incomplete transfers.

In some embodiments, the classifier may output likelihood values associated with each of the categories, and the engagement inference may be determined as the category associated with the highest likelihood. In other embodiments, engagement inference may be defined by applying thresholds to the likelihood distribution. For example, probabilities above a first threshold may be classified as in-reception-component, probabilities below a second threshold may be classified as out-of-reception-component, and probabilities between the thresholds may be classified as near-reception-component. Such approaches may enable confidence-based classification, permitting both deterministic outputs and probabilistic review queues for operator verification.

In certain implementations, classifiers may be trained using annotated datasets that include in-reception-component, out-of-reception-component, and near-reception-component examples. Training may leverage video sequences capturing transfer components hovering above rims, angled insertions, or marginal entries, thereby allowing the classifier to distinguish between confident in-reception-component engagements and ambiguous near-reception-component states. Annotated training data may further capture operational anomalies such as transfer components moving too quickly past the rim, producing uncertain engagement states. By incorporating near-reception-component categories, engagement inference may more accurately reflect real-world laboratory conditions in which operators perform liquid aspiration with varied speeds and angles.

Accordingly, S260D may function to output probabilistic, multi-class engagement inferences that differentiate between in-reference-component, out-of-reference-component, and near-reference component states. S260D may enable robust engagement tracking under ambiguous or borderline conditions, thereby improving traceability and supporting error detection.

In a non-limiting example as described with reference to FIG. 8, the engagement inference produced by engagement inference generator 140A may indicate a likelihood that transfer component 107A is within one of two or more liquid transfer position categories (e.g., as interpreted and output by engagement inference interpreter 805 of engagement status generator 145A). The two or more liquid transfer position categories may include a first liquid transfer position category 810A indicating that the transfer component is within the successful liquid transfer position 820 and a second liquid transfer position category 810B indicating that the transfer component 107A is outside of the successful liquid transfer position 820. Additionally, the second liquid transfer position category 810B may indicate that the transfer component 107A is outside of a near-boundary liquid transfer position 825 and the two or more liquid transfer position categories may include a third liquid transfer position category 810C that indicates that the transfer component 107A is within the near-boundary liquid transfer position 825 and outside of the successful liquid transfer position 820. Engagement inference interpreter r805 may output a liquid transfer position category to engagement status constructor 815, which may construct and output an engagement status corresponding to the liquid transfer position category that is then provided to a user device 150A via a user interface.

Replay of Image Data for Intermediate Engagement States

In some embodiments, S260D may further include generating engagement inferences that trigger storage and retrieval operations for recorded image data. In one or more embodiments, image data captured during the liquid-transferring operation may be stored in memory accessible to the one or more processors. The stored image data may include both raw image sequences and perspective-normalized regions of interest prepared for classification.

In operation, when an engagement inference indicates that the transfer component is in a near-boundary state, the system may retrieve a portion of the stored image data corresponding to a time interval preceding the inference. In one or more embodiments, the retrieved portion may include several frames before and/or after the classification event, thereby enabling a contextual review of the transfer component trajectory. This retrieval capability may function to support traceability, troubleshooting, and retrospective validation of ambiguous transfer events.

In certain implementations, the retrieved portion of image data may be supplied to the user interface to enable visual replay. The replay may be rendered as a video segment, a frame-by-frame sequence, or an annotated overlay showing the transfer component tip relative to the rim boundary. In some embodiments, the replay may be combined with classifier confidence scores, color-coded indicators, or temporal markers to assist the operator in determining whether corrective action is required. In some examples, liquid transfer detection system 101A may output, along with the retrieved portion of stored image data, identifiers of reception components that were visited during the timeframe associated with the retrieved portion (e.g., for aspirating, dispensing, or both).

In some embodiments, the retrieval capability may function as an "instant replay" feature that allows operators to immediately review ambiguous liquid transfer events in real time. The replay may be initiated automatically upon detection of a near-reception-component state, or manually through a user interface control. The retrieved data may further be stored in association with metadata such as timestamps, operator identifiers, and reception component identifiers, enabling root cause analysis of experimental anomalies. It should be noted that the instant replay functionality, in at least some examples, may be independent of engagement with reception components (e.g., instant replay may be triggered via interaction with a control element on the user interface).

Accordingly, the inclusion of storage and retrieval functions in S260D may provide users with immediate and retrospective visibility into borderline or erroneous liquid transfer events, facilitating rapid resolution of potential liquid transfer errors without repetition of entire experimental protocols.

Figure 12:
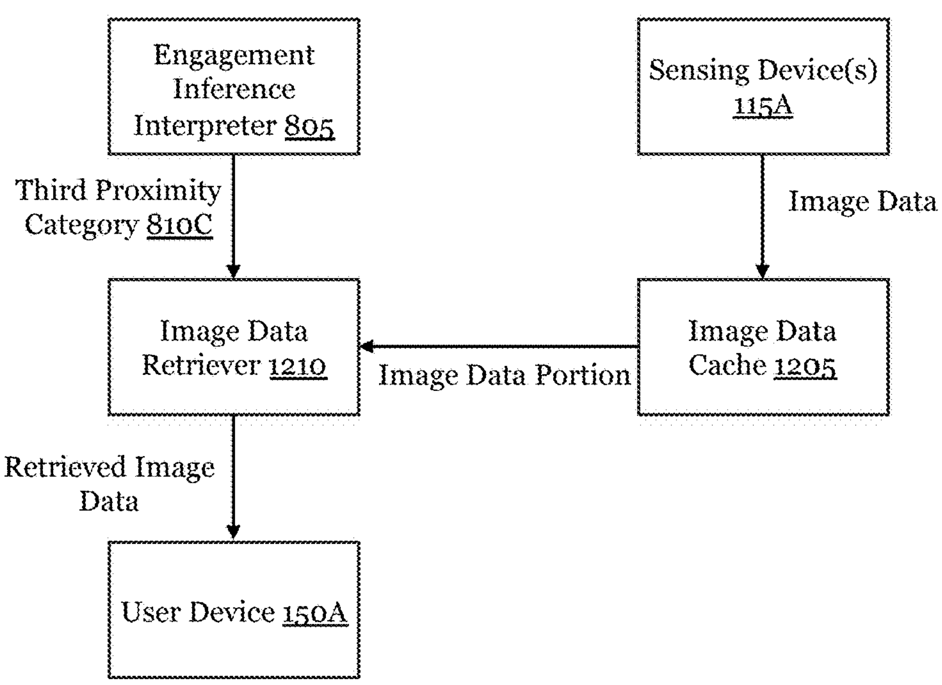
FIG. 12 illustrates an example image data replay procedure 1200 in accordance with one or more embodiments of the present application.

In a non-limiting example, as described with reference to FIG. 12, sensing device(s) 115A may output image data to image data cache 1205 and image data cache 1205 may store, in memory accessible to one or more processors, the image data captured during the liquid-transferring operation 102A. Additionally, image data retriever 1210 may retrieve, in response to the engagement inference indicating that third proximity category 810C is most likely (engagement inference interpreter 805 providing an indication of third proximity category 810C), a portion of the stored image data corresponding to a time interval preceding the outputting of the engagement inference from image data cache 1205.

Image data retriever 1210 may output, via a user interface with user device 150A, the retrieved portion of the stored image data.

Liquid Volume Estimation Via a Regression Model

In some examples, S260D may include providing the transformed portion of the image data to a regression model, which may function to estimate a volume of liquid contained within a transfer component of liquid-transferring device 105A. In one or more embodiments, S260D may function to enable detection of actual liquid transfer events between the transfer component and a reception component of sample plate 110A by analyzing image data in addition to engagement inferences.

As referred to herein, a regression model may include a machine learning model, statistical model, or computational algorithm configured to output continuous values rather than categorical classifications. In the context of liquid handling, the regression model may be trained to estimate the volume of liquid present in a transfer component, such as a pipette tip, based on visual features extracted from the transformed image data.

Additionally, or alternatively, in some embodiments, the transformed portion of the image data provided to the regression model may include normalized or perspective-corrected representations of the transfer component tip generated in S260B. Such representations may preserve features such as liquid meniscus levels, refraction patterns, or pixel intensity gradients that are indicative of fluid volumes.

Accordingly, in operation, providing the transformed portion of the image data to the regression model may include extracting relevant image features, encoding them into a feature vector, and supplying the vector as input to the regression model. The regression model may output a predicted continuous value corresponding to an estimated volume of liquid within the transfer component.

Outputting, by the regression model, an estimation of liquid volume may enable the system to detect whether liquid transfer has occurred between the transfer component and the reception component. For example, a reduction in estimated volume following engagement may indicate that liquid has been dispensed, while an increase may indicate that liquid has been aspirated.

2.70 Output an Engagement Status Indicating Whether the Transfer Component is within the Successful Liquid Transfer Position S270, which includes outputting, via a user interface and based at least in part on the engagement inference, an engagement status indicating whether the position and the orientation of the transfer component is within the successful liquid transfer position relative to the rim of the reception component, may function to deliver actionable feedback to laboratory personnel and to record engagement results for traceability. In one or more embodiments, one or more processors of system 100 may map engagement inferences produced in S260 into interpretable user-facing indicators or machine-readable outputs.

As referred to herein, an engagement status may refer to an output that communicates a classification of transfer component alignment relative to a liquid-reception boundary. In one or more embodiments, the engagement status may be a symbolic state such as "in a successful liquid transfer position," "outside of a successful liquid transfer position," or "near a liquid transfer position." In other embodiments, the engagement status may include graphical overlays, color-coded indicators, or numeric confidence scores derived from the underlying inference probabilities.

In operation, generating the engagement status may include displaying results in a graphical interface of user device 150A. For example, a valid liquid transfer position may be highlighted in green, an invalid liquid transfer position may be shown in red, and an uncertain liquid transfer position may be represented in yellow. In some embodiments, engagement statuses may be mapped onto a digital plate representation of the sample plate, where individual reception components are marked as completed or flagged depending on transfer accuracy. In other embodiments, the engagement status may be communicated through audible cues, such as tones or spoken warnings, to enable rapid operator response.

In certain implementations, engagement statuses may be logged together with experiment metadata, including timestamps, operator identifiers, and reception component identifiers. Such logs may be integrated with laboratory information management systems (LIMS) or electronic lab notebooks (ELNs) to support compliance constraints and experiment reproducibility. In some embodiments, flagged statuses may be linked to specific image frames or video segments, enabling replay of liquid transfer events for post-hoc validation and operator training.

In further embodiments, engagement statuses may be used for real-time correction and post-experiment analysis. During operation, engagement statuses may alert operators to errors before liquid is dispensed, reducing failed transfers. After experiments, engagement status records may be cross-referenced with assay results to identify outlier data potentially linked to misalignment, droplets, or other anomalies detected during transfer.

Accordingly, S270 may function to convert engagement inferences into actionable and traceable outputs that guide operators in real time and support retrospective review. S270 may enable interactive, auditable engagement monitoring by providing digital sample plate maps, visual and auditory feedback, and integration with laboratory recordkeeping systems, thereby improving both accuracy and accountability of liquid handling workflows.

In a non-limiting example, as described with reference to FIG. 1A, engagement status generator may output, via a user interface and based on the engagement inference received from engagement inference generator 140A, an engagement status indicating whether the position and the orientation of the transfer component 107A (e.g., transfer component position 305 and transfer component position 310) is within the successful liquid transfer position (e.g., successful liquid transfer position 820 of FIG. 8) relative to the rim of the reception component 110A.

Real-Time Protocol Guidance

In some embodiments, S270 may further include generating and updating a digital plate map representing a set of reception components of the sample plate. In one or more embodiments, the digital plate map may be initialized as a graphical representation of wells in a multiwell plate or other container array. Each reception component may be represented in the digital plate map with a position identifier corresponding to its physical location within the receptacle.

In operation, the digital plate map may be dynamically updated based at least in part on engagement inferences generated during the liquid transfer process. When an engagement inference indicates that the transfer component has entered a successful liquid transfer position relative to a given rim boundary, the system may mark the corresponding position within the digital plate map as engaged. Updates may include visual indicators such as highlighting, color coding, or symbols indicating that liquid has been dispensed or aspirated at the designated reception component location.

In certain implementations, the updated digital plate map may be output via the user interface, providing operators with real-time feedback on the status of each reception component. The interface may display which reception components have been successfully engaged, which remain pending, and which have been flagged with error conditions or rule violations. The digital plate map may further be combined with metadata such as timestamps, operator identifiers, or fluid types, thereby functioning as a digital record of experimental progress.

In one or more embodiments, the digital plate map may be configured to guide operators through multi-step protocols. For example, reception components already addressed may be visually distinguished from reception components scheduled for subsequent steps, ensuring procedural compliance and reducing operator error. In some cases, the digital plate map may also support audible guidance, enabling hands-free operation in laboratory environments where operators wear gloves or operate under sterile conditions.

Accordingly, S270 may function to provide an aggregated, continuously updated digital representation of liquid transfer operations across an entire receptacle, improving operator efficiency, reducing the likelihood of skipped or repeated reception components, and enabling full traceability of experimental procedures through digital mapping.

In a non-limiting example, as described with reference to FIG. 1A, engagement status generator 145A may generate, by one or more processors, a digital plate map representing a set of reception components of the sample plate 110A. Engagement status generator 145A may update the digital plate map based in part on the output engagement inference to indicate that the reception component 110A whose liquid reception boundary has the intersection point with the pointing vector has been engaged and may output, via the user interface, an indication of the updated digital plate map.

Figure 15A:
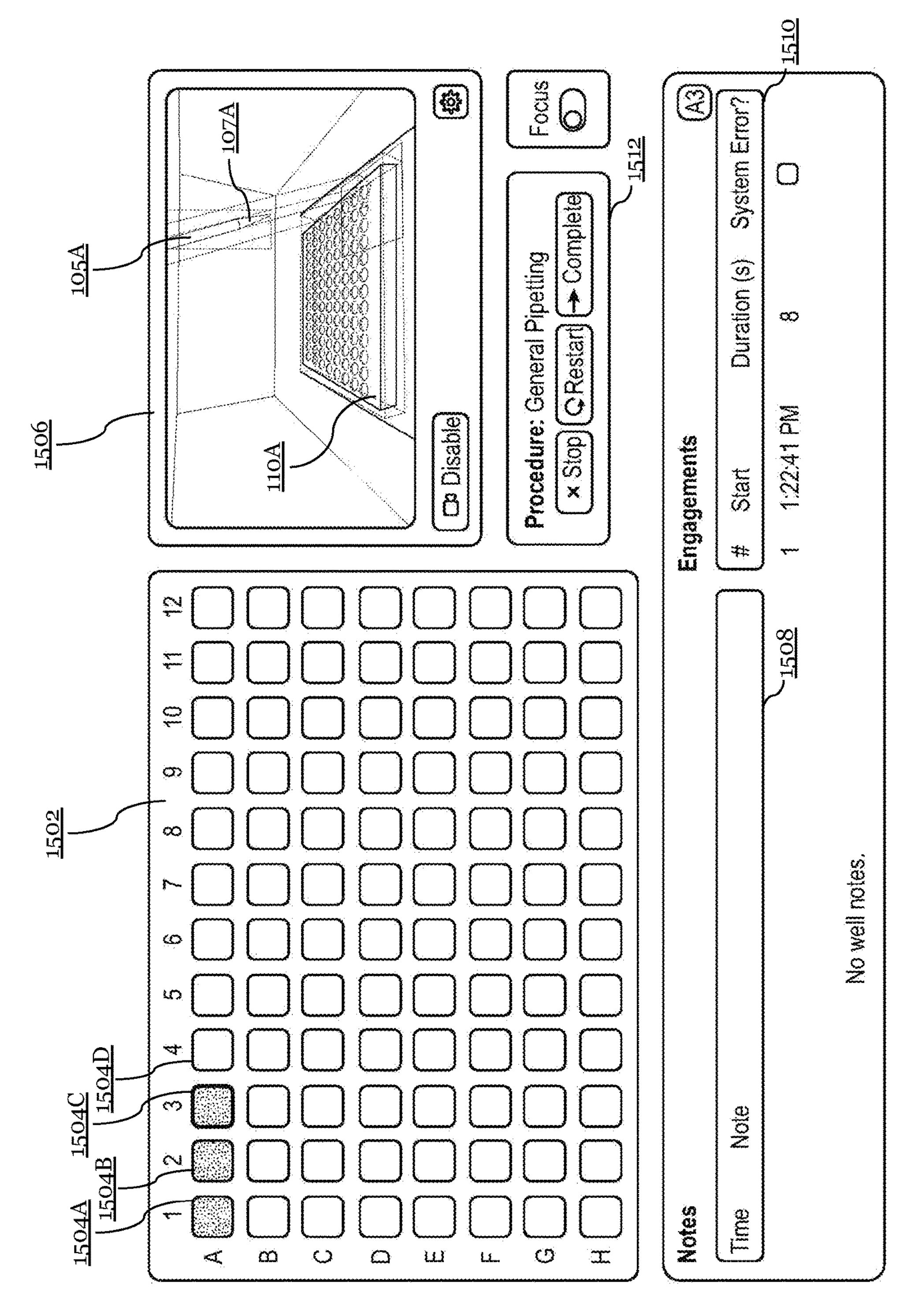
FIGS. 15A through 15C, 16A through 16E, and 17 illustrate example user interfaces 1500A through 1700 in accordance with one or more embodiments of the present application.
Figure 15B:
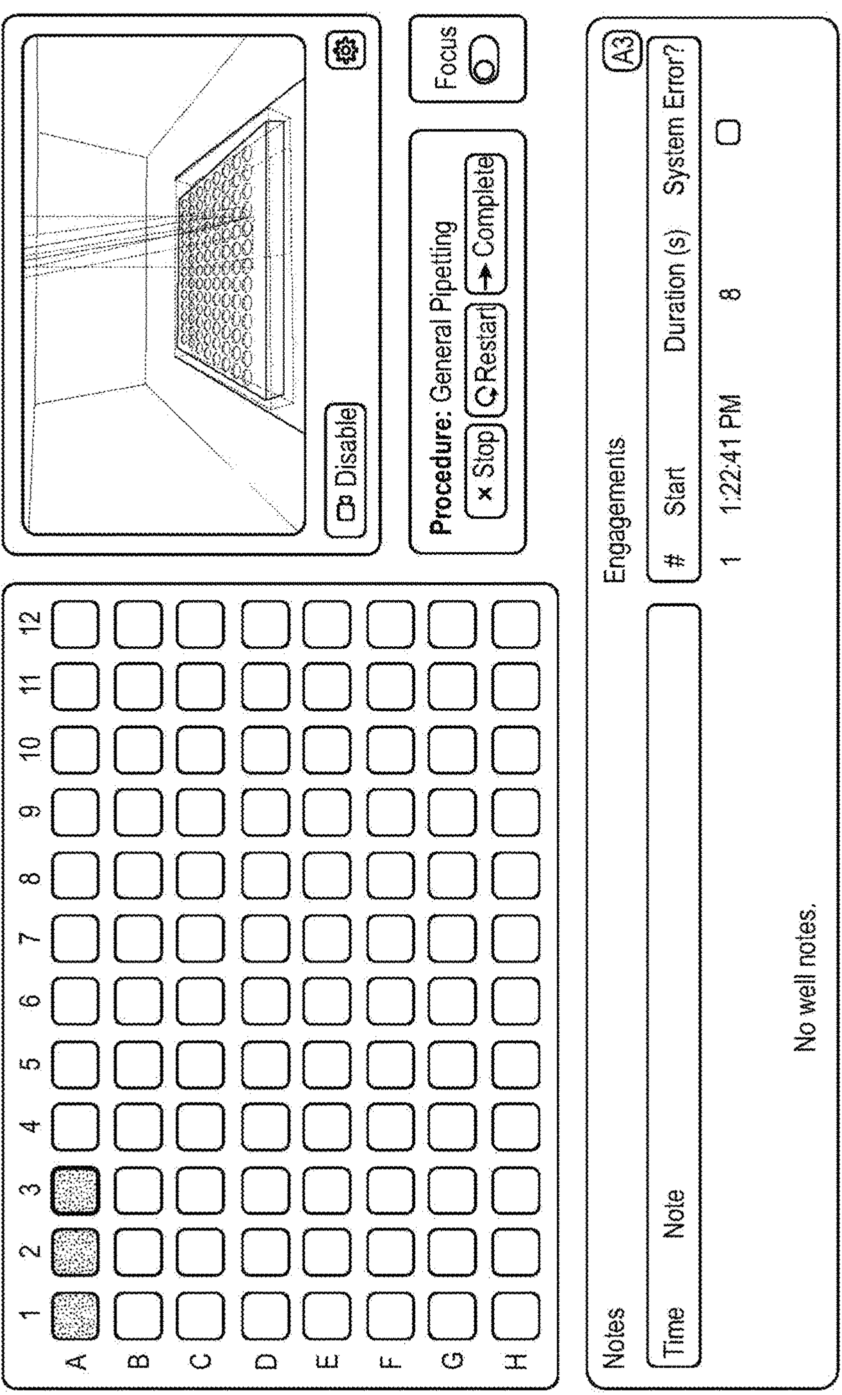
Figure 15C:
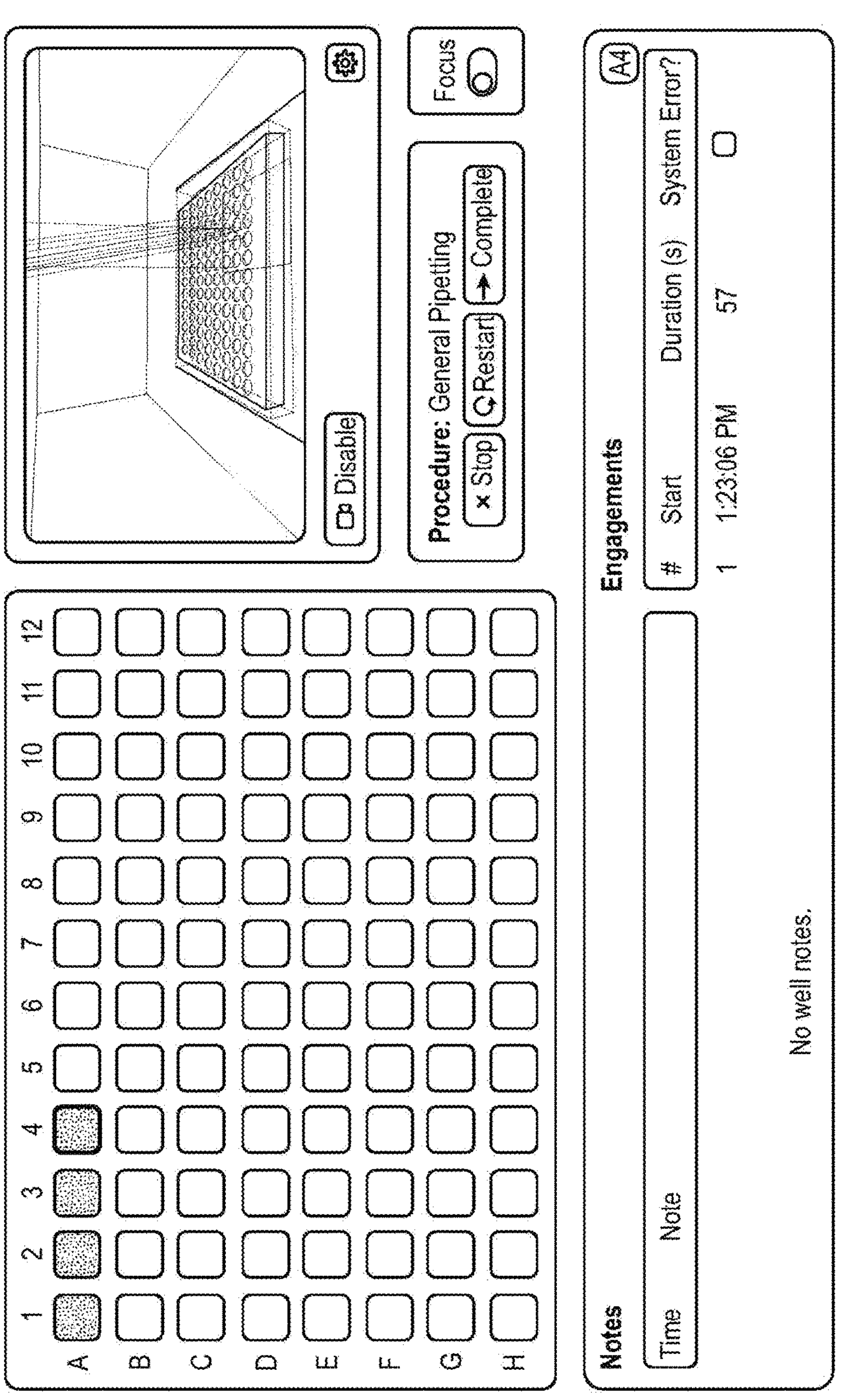

FIGS. 15A through 15C may depict a digital plate map 1502 corresponding to a sample plate 110A with a set of reception components arranged in columns and rows. The rows may be labeled as A, B, and so on and the columns may be labeled as 1, 2, and so on (e.g., display elements 1504A, 1504B, 1504C, and 1504D may represent a first, second, third, and fourth reception component, respectively). The user interface as depicted in FIGS. 15A through 15C may include the digital plate map 1502, a user interface display element 1506 for displaying obtained image data in real-time; a user interface display section 1508 for displaying any guidance notes provided by the liquid transfer detection system 101A; a user interface display section 1510 for displaying recorded engagements for a particular reception component; and a user interface control section that displays a type of liquid transferring operation to perform and includes control elements for indicating that the operation is to be stopped, that the operation is to be restarted, and/or that the operation is completed. The user interface display section 1506 may further include a user interface control element for disabling the user interface display element for displaying obtained data and a user interface control element for configuring settings.

In some examples, the user interface display element may display one or visual indicators along with the sample plate and/or the liquid-transferring device. For instance, the user interface display element may depict a sample plate plane, a bounding box around the transfer component of the liquid-transferring device, a bounding box around the liquid-transferring device, a geometric region indicating a where a liquid-transferring device may be detected, a geometric region representing a sample plate, and/or a visual indicator of which liquid transfer position category is most recently associated with the transfer component.

FIGS. 15A through 15C may illustrate an example of updating a digital plate map as depicted with reference to a user interface. For instance, initially in FIG. 15A, reception components in row A and columns 1, 2, and 3 (e.g., reception component with identifiers A1, A2, and A3, corresponding to user interface display elements 1504A, 1504B, and 1504C) may have been visited by the transfer component of the liquid-transferring device. As depicted in FIG. 15B, the transfer component of the liquid-transferring device may visit the reception component in row A and column 4 (e.g., a reception component with identifier A4, corresponding to user interface display element 1504D). Once the transfer component disengages the reception component, as depicted in FIG. 15C, the digital plate map 1502 may be updated to indicate that reception component A4 has been visited. Additionally, the user interface may update the user interface display section 1510 associated with recorded engagements to indicate an entry time of a corresponding engagement, a duration of the engagement and/or an ordering of the engagement relative to other engagements.

Figure 16A:
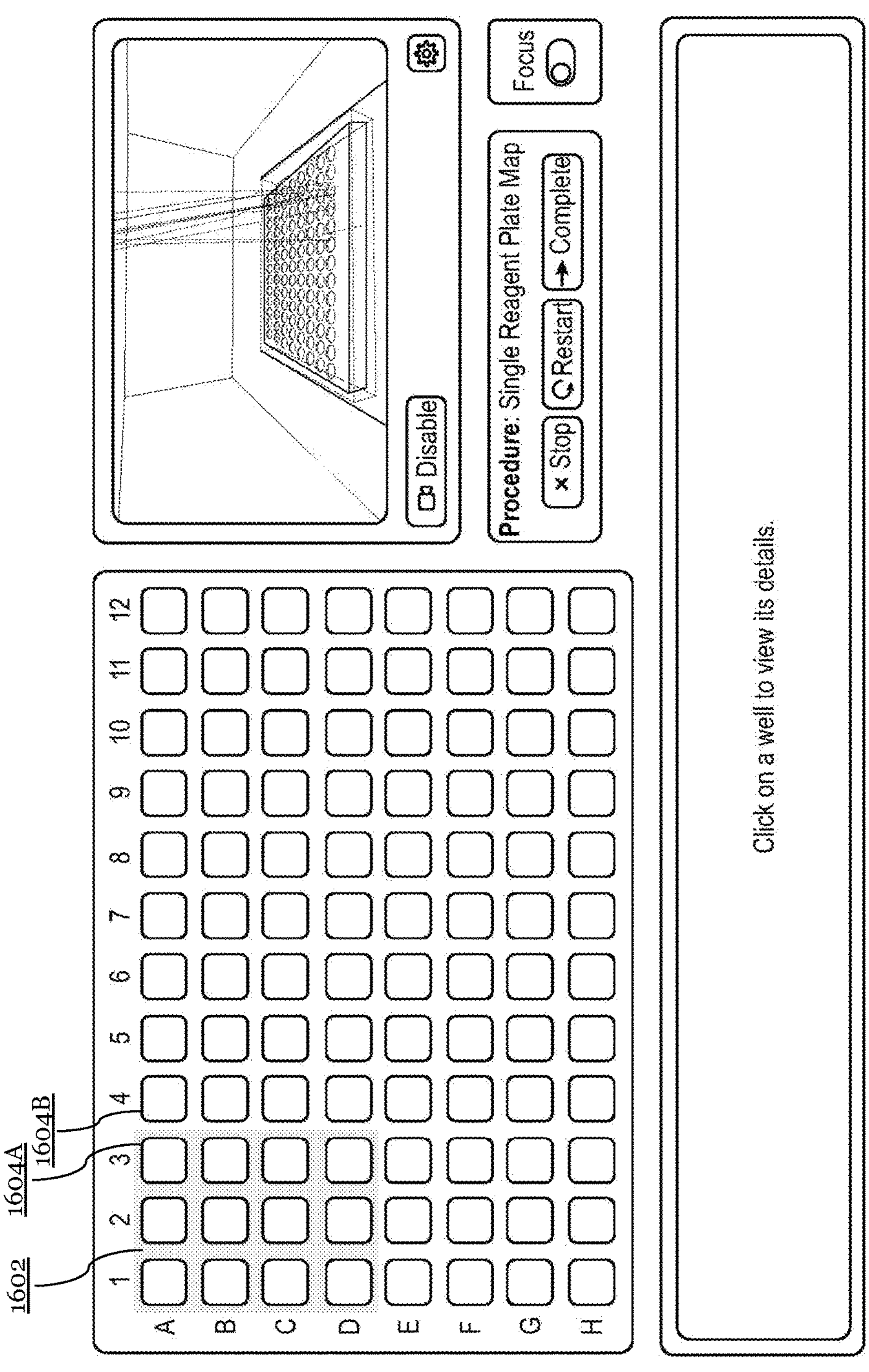
Figure 16B:
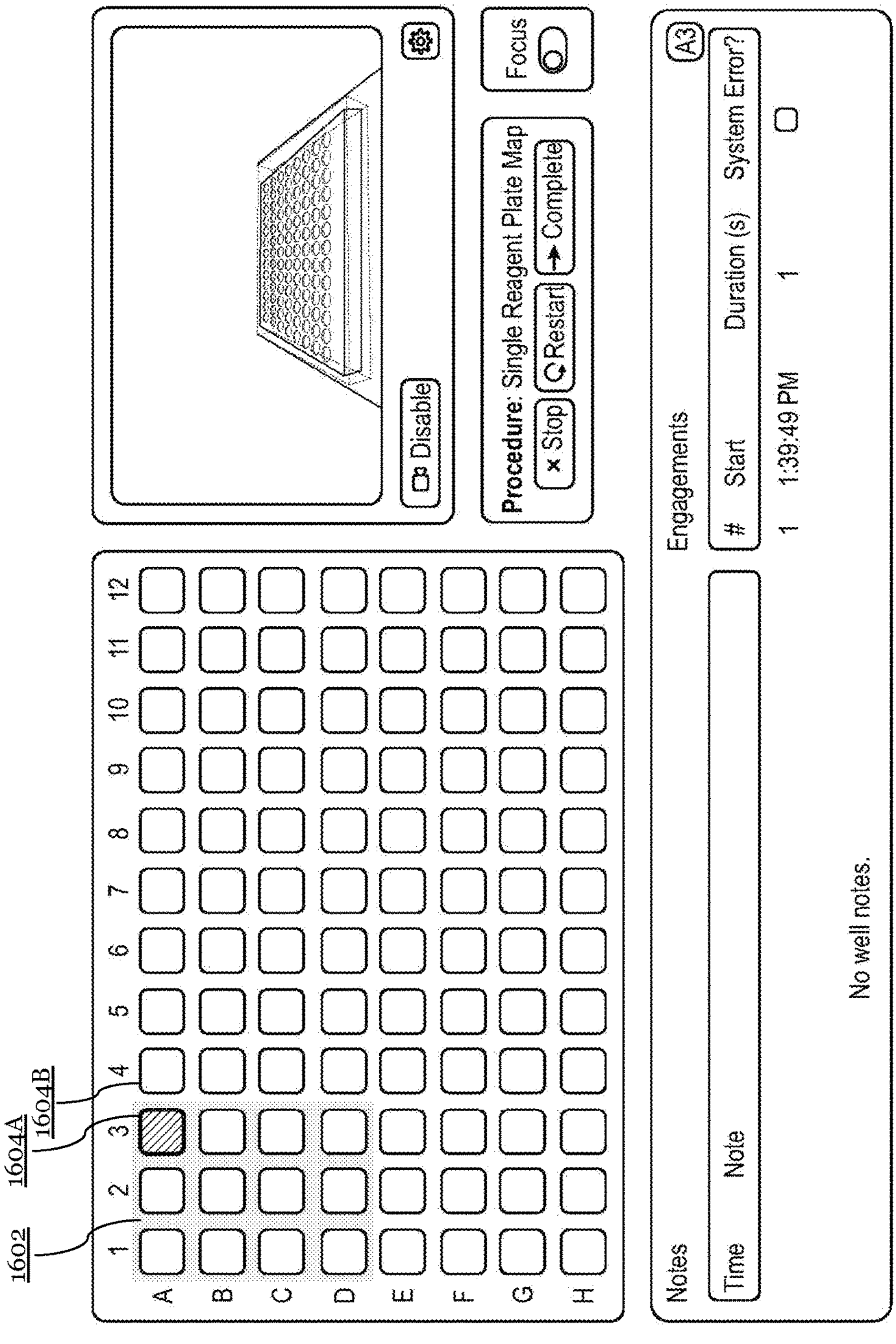
Figure 16C:
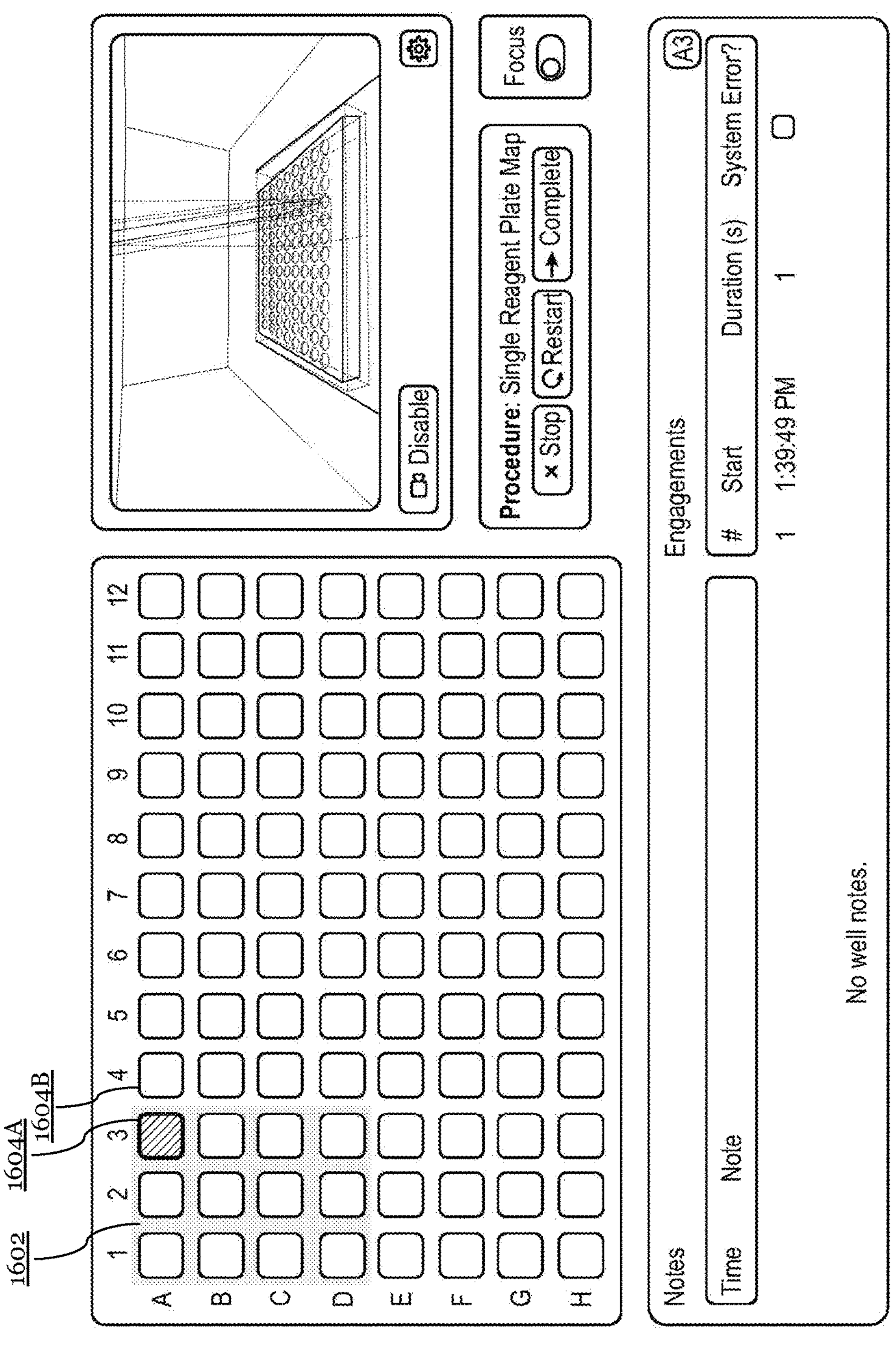
Figure 16D:
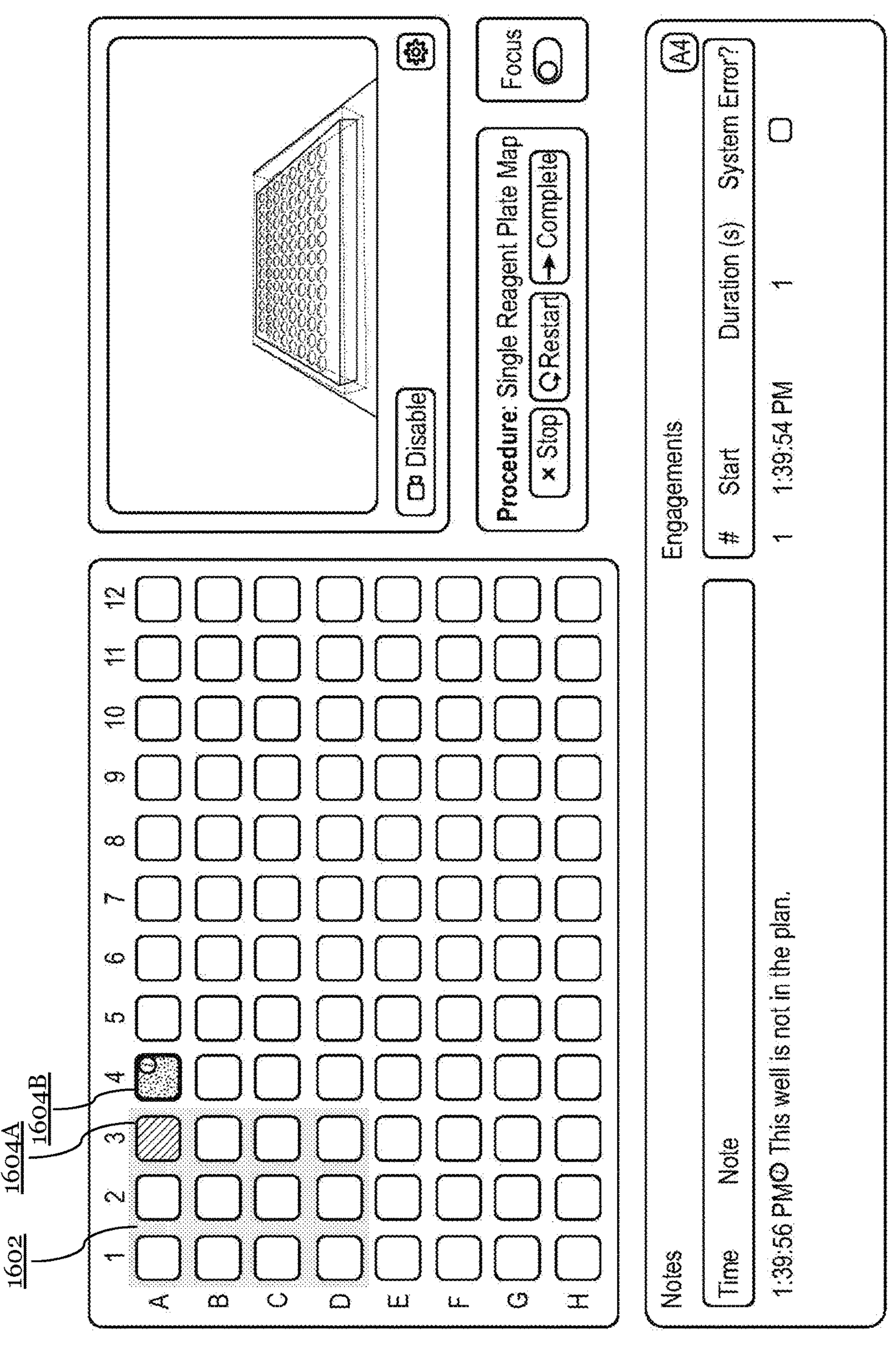
Figure 17:
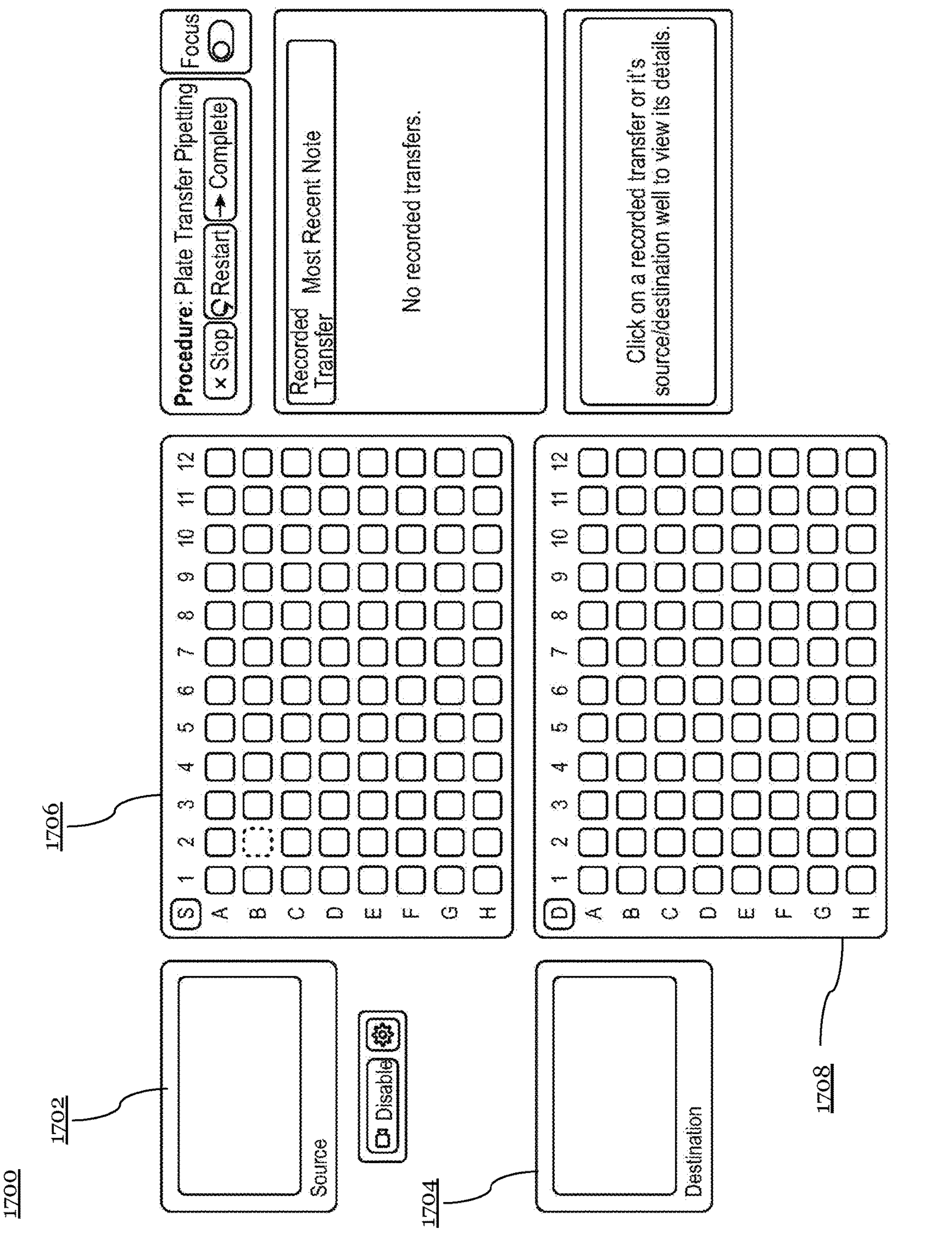

FIGS. 16A through 16C may depict a similar user interface to that described in FIGS. 15A and 15C, but may further include a user display element 1602 indicating a sub-region of reception components available for a liquid-transferring operation. FIG. 17 may likewise depict a similar user interface for liquid-transferring operations between two sample plates. The user interface may include a first user interface display element 1702 for displaying image data received for the second sample plate and may include and a second user interface display element 1704 for displaying image data received for the sample plate (e.g., each may be associated a respective one or more sensing devices). Likewise, the user interface may include a respective digital plate map for both the second sample plate and the sample plate (e.g., digital plate map 1706 for the second sample plate and digital plate map 1708 for the plate map). Additionally, the user interface may include a user interface control section that displays a type of liquid transferring operation to perform and includes control elements for indicating that the operation is to be stopped, that the operation is to be restarted, and/or that the operation is completed; a user interface display section indicating recorded transfers and/or a most recent guidance note provided by the liquid tracking; and a user interface display section for displaying information about a recorded transfer, a reception component of a second sample plate, and/or a reception component of a sample plate. It should be noted that the second sample plate may have a similar or identical form to the sample plate (e.g., the second sample plate and sample plate may each be a microwell plate or a well plate).

Dynamic Engagement Status Updates for Real-Time Positional Changes

In some embodiments, S270 may further include dynamically updating engagement statuses based on successive inputs of image data. In one or more embodiments, sensing devices may continue capturing additional frames during a liquid-transferring operation, and one or more processors may apply pose estimation models to detect updated positions and orientations of the transfer component. Updated pointing vectors may be generated and compared against liquid-reception boundaries to identify updated intersection points.

In operation, when an engagement inference initially indicates that the transfer component is within the successful liquid transfer position, subsequent frames may be analyzed to determine whether the transfer component later transitions outside the rim boundary. If the updated analysis indicates that the transfer component has moved out of the successful liquid transfer position, the system may output an updated engagement inference and, in turn, output an updated engagement status indicating the out-of-boundary condition. Such dynamic reassessment may occur in real time, enabling operators to respond immediately when the transfer component drifts away from valid alignment.

In some embodiments, this updating may involve repeating the classification sub-steps of S260A through S260D on newly captured image data. For example, a new region of interest may be identified, transformed through a projective mapping, and resubmitted to a classifier for inference. The resulting updated inference may then be mapped to a user-facing status that overrides or modifies a prior status displayed in the interface. In certain implementations, graphical indicators may transition from green (in-position) to red (out-of-position), or from green to yellow when the updated inference indicates proximity to but not within a rim boundary.

In other embodiments, streamlined detection may be applied when updated intersection points fall clearly outside of rim boundaries. In such cases, the system may bypass intermediate classification steps and output an updated engagement status indicating that the transfer component is outside of the successful liquid transfer position. This optimization may reduce computational latency while ensuring timely feedback to the operator.

Accordingly, S270 may function to provide continuous, dynamically updated engagement statuses that reflect the changing position and orientation of the transfer component across time, enabling real-time corrective guidance during liquid handling operations and reducing the likelihood of failed transfers, missed reception components, or cross-contamination events.

Temporal Sequencing and Metadata Logging of Engagement Events

In some embodiments, S270 may further include generating temporal sequences of engagement inferences derived from successive frames of image data. In one or more embodiments, the engagement inference classifier may output engagement inferences for each frame, and one or more processors may aggregate the inferences into a sequence representing transitions of the transfer component relative to a rim boundary. From this sequence, the system may detect an entry time when the transfer component is classified as entering a successful liquid transfer position and an exit time when the transfer component is classified as withdrawing from the position. The entry and exit times may be mapped to an engagement status and output via the user interface, thereby providing operators with precise timing of transfer-component-to-reception-component interactions.

In certain implementations, temporal sequencing may further identify a total duration of engagement, enabling measurement of dwell times during which liquid aspiration or dispensing may occur. These timing measurements may serve as diagnostic indicators of operator consistency and may support retrospective evaluation of experimental variability. For example, shorter or longer than expected dwell times may be correlated with assay performance metrics, enabling identification of sources of variation in downstream results.

In some embodiments, metadata associated with the temporal sequence may be recorded in a log accessible to one or more processors. The metadata may include the entry time, the exit time, the total duration between entry and exit, and a position identifier of the reception component engaged. Further the metadata may include a volume of liquid within the transfer component (or a volume of the transfer component), a size of liquid within the transfer component (or a size of the transfer component), an indication of whether a bubble is present within the transfer component, an indication of whether a hanging droplet is on the transfer component, an indication of whether excess liquid is on an exterior surface of the transfer component, an indication of whether the transfer component has an attachment defect, an indication of whether the transfer component has a size defect, an indication of an orientation of the liquid-transferring device which includes the transfer component, a humidity associated with an environment in which the liquid-transferring operation is being performed, a temperature associated with the environment in which the liquid-transferring operation is being performed, or a combination thereof. Logs may be stored in association with operator identifiers, timestamps of broader experiments, or digital plate maps, thereby enabling comprehensive traceability of liquid transfer operations.

In operation, metadata stored in the log may be retrievable upon request via the user interface. For example, an operator or auditor may query the log for engagement timings associated with a particular reception component or protocol step. In response, the system may output the requested metadata to the interface in tabular or graphical form. In some embodiments, log entries may be accompanied by links to stored image or video data, enabling synchronized review of both temporal and visual evidence of liquid transfer events.

Accordingly, S270 may function to record and provide access to detailed temporal and metadata logs, thereby supporting audit trails, reproducibility assessments, and root cause analysis of anomalous assay results.

Figure 10:
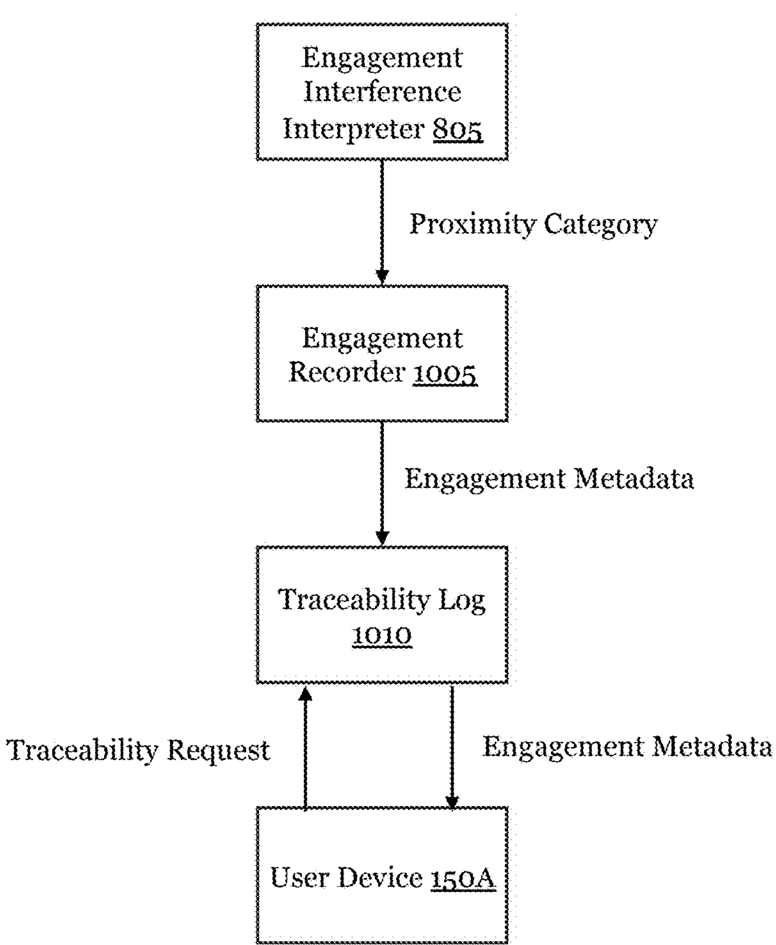
FIG. 10 illustrates an example traceability logging procedure 1000 in accordance with one or more embodiments of the present application.

In some examples, as described with reference to FIGS. 1B and 10, engagement inference classifier 143A may output successive engagement inferences received from engagement inference interpreter 805 over a set of frames of the image data. Engagement inference interpreter 805 may map the successive engagement inferences to a corresponding liquid transfer position category and may provide the corresponding liquid transfer position category to an engagement recorder 1005.

Figure 9A:
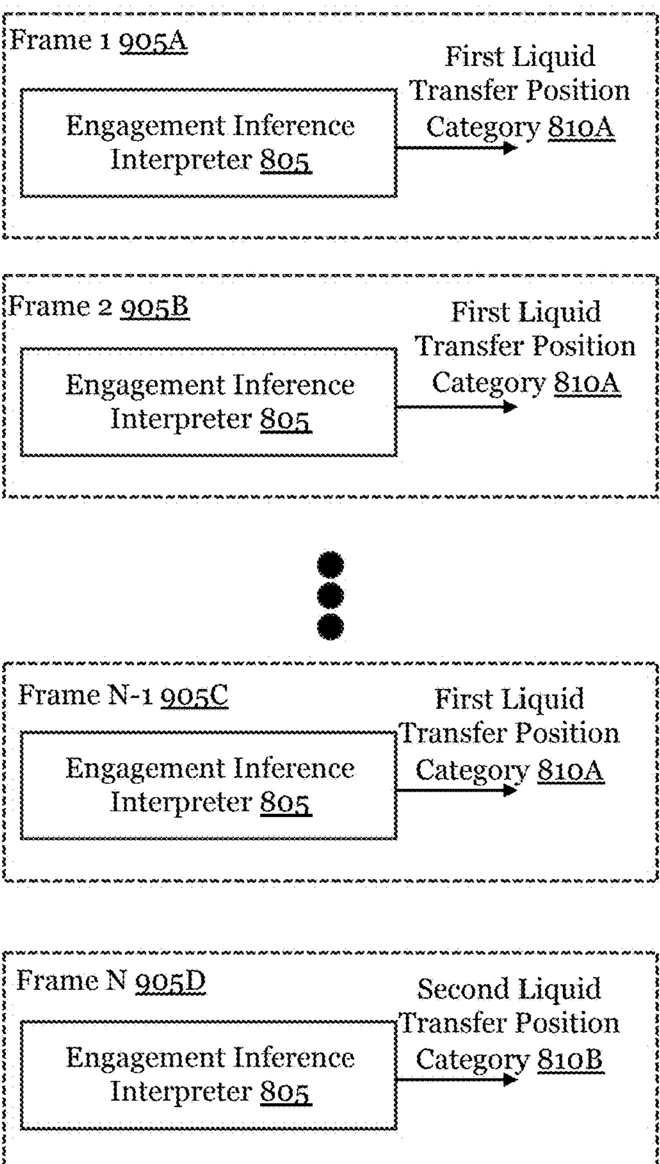
FIG. 9A illustrates an example liquid transfer position category frame set 900A in accordance with one or more embodiments of the present application.
Figure 9B:
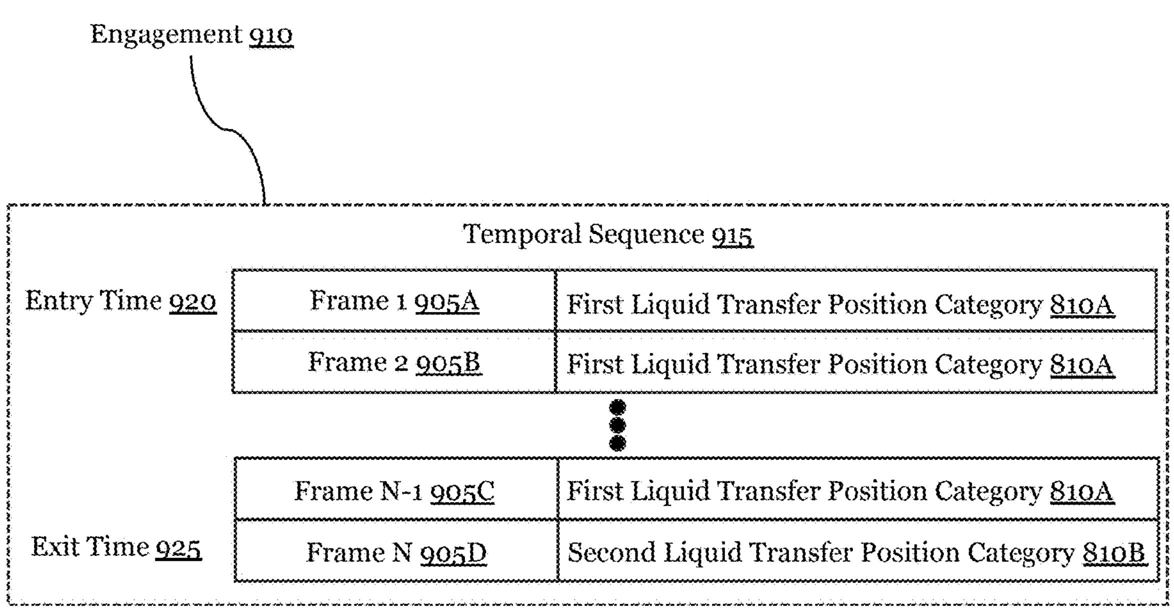
FIG. 9B illustrates an example temporal sequence 900B in accordance with one or more embodiments of the present application.

Engagement recorder 1005 may generate, from the successive engagement inferences, a temporal sequence of classifications representing transitions of transfer component 107A relative to reception component 112A. For instance, as depicted in FIG. 9A, engagement inference interpreter 805, at a first frame 905A, may output a first liquid transfer position category 810A for a corresponding first engagement inference. Likewise, engagement inference interpreter 805, at a second frame 905B, may output the first liquid transfer position category 810A for a corresponding second engagement inference and may continue to do so up to and including third frame 905C, where the first liquid transfer position category 810A is output for a third engagement inference. At fourth frame 905D, engagement inference interpreter 805 may output a second liquid transfer position category 810B corresponding to a fourth engagement inference. As depicted in FIG. 9B, engagement recorder 1005 may then generate a temporal sequence 915 recording an engagement 910, where the temporal sequence 915 may include each of frames 905A, 905B, 905C, and 905D as well as the corresponding liquid transfer position category values.

Engagement recorder 1005 may detect, from the temporal sequence 915, an entry time 920 (e.g., corresponding to frame 905A) and an exit time 925 (e.g., corresponding to frame 905D) of the transfer component 107A relative to the reception component 112A. Engagement recorder 1005 may output, via a user interface and to user device 150A, the entry time 920 and the exit time 925 of the transfer component 107A relative to the reception component 112A.

Additionally, or alternatively, engagement recorder 1005 may provide engagement metadata to traceability log 1010 and traceability log 1010 may store the engagement metadata. The engagement metadata may include one or more of the entry time 920, the exit time 925, a total duration between the entry time 920 and the exit time 925, or a position identifier of the engaged reception component. Traceability log 1010 may receive, via a user interface with user device 150A, a request for the metadata within traceability log 1010 (e.g., a traceability request) and may output, via the user interface, the engagement metadata within the log based on the received request.

Rule-Based Validation and Alert Messaging for Recorded Engagements

In some embodiments, S270 may further include recording engagements between the liquid-transferring device and the sample plate based on engagement inferences. Engagements may be recorded when the classifier indicates that the transfer component is within the successful liquid transfer position of a rim boundary. The recorded engagements may be stored in memory and may include associated metadata such as reception component identifiers, timestamps, and operator identifiers.

In operation, the recorded engagements may be compared against one or more predefined transfer rules that specify permitted and prohibited interactions between transfer components and reception components. Transfer rules may be encoded as procedural logic, such as limiting the number of times a given reception component may be accessed, restricting which reception components are eligible to receive transfers in a particular protocol, or defining valid transfer paths between different receptacles. When a recorded engagement is determined to have breached at least one transfer rule, the system may output an engagement alert message via the user interface. Such alerts may be displayed as graphical overlays, audible notifications, or text-based warnings, enabling operators to take corrective action in real time.

In certain embodiments, transfer rules may include constraints limiting the number of engagements that a transfer component may perform with a given reception component. For example, when the number of recorded engagements with a particular reception component exceeds a predefined threshold quantity, the system may determine that a rule violation has occurred and output an alert message indicating the breach. Such constraints may reduce the risk of overfilling reception components or introducing cross-contamination due to repeated insertions of the transfer component.

In other embodiments, transfer rules may include constraints limiting a subset of reception components as eligible destinations. When an engagement occurs with a reception component outside of the designated subset, the system may determine that the engagement has violated a rule and may output an engagement alert message identifying the unauthorized engagement. This functionality may provide additional assurance of compliance with pre-specified assay protocols, where only certain reception components are intended to receive samples or reagents.

In further embodiments, transfer rules may include constraints governing transfer paths between different receptacles. For example, when a transfer component carries liquid from a second receptacle and attempts to dispense into a reception component of a first receptacle, the system may compare the engagement against predefined valid transfer paths. If the engagement is associated with an invalid transfer path, the system may generate an alert message indicating the violation. Such path-based constraints may reduce protocol errors, such as transferring liquids into incorrect assay groups, and may support adherence to complex experimental workflows. In some examples, the alert message may include an indication to a user interface to update a color or text within a display area (e.g., text indicating that an action needs review).

Accordingly, S270 may function to enforce procedural correctness by comparing recorded engagements against rule sets, thereby providing real-time alerts for protocol violations and increasing reliability, reducing operator error, and supporting compliance with laboratory standards and regulatory constraints.

Figure 11:
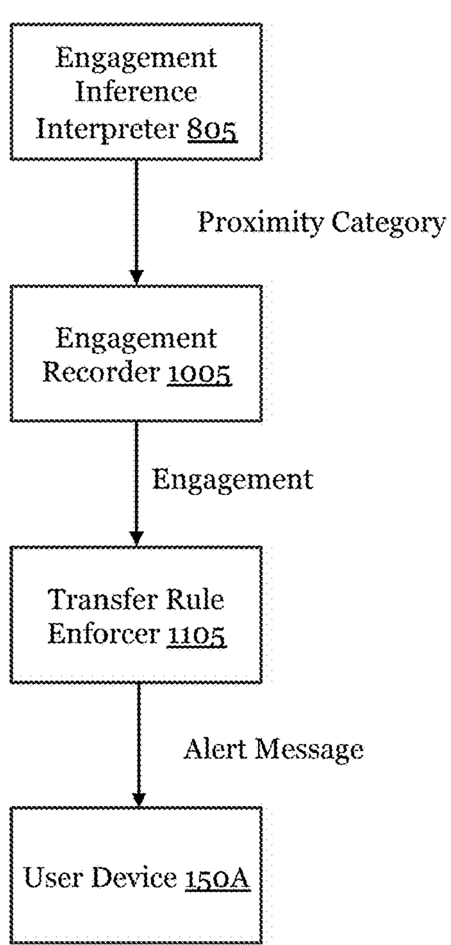
FIG. 11 illustrates an example transfer rule enforcement procedure 1100 in accordance with one or more embodiments of the present application.

In a non-limiting example, as described with reference to FIG. 11, engagement inference interpreter 805 may provide an indication of a proximity category associated with an engagement inference to engagement recorder 1005. Engagement recorder 1005 may record an engagement between the liquid-transferring device and the sample plate based on the engagement inference indicating that the transfer component is within the successful liquid transfer position of the rim of the reception component. Engagement recorder 1005 may provide an indication of the recorded engagement to transfer rule enforcer 1105A, where transfer rule enforcer 1105 may compare the recorded engagement against one or more predefined transfer rules defining permitted and prohibited engagements of the transfer component with the reception component. Transfer rule enforcer 1105 may output, via the user interface, an engagement alert message indicating that the recorded engagement has breached at least one of the one or more predefined transfer rules based at least in part on the comparison.

Figure 16E:
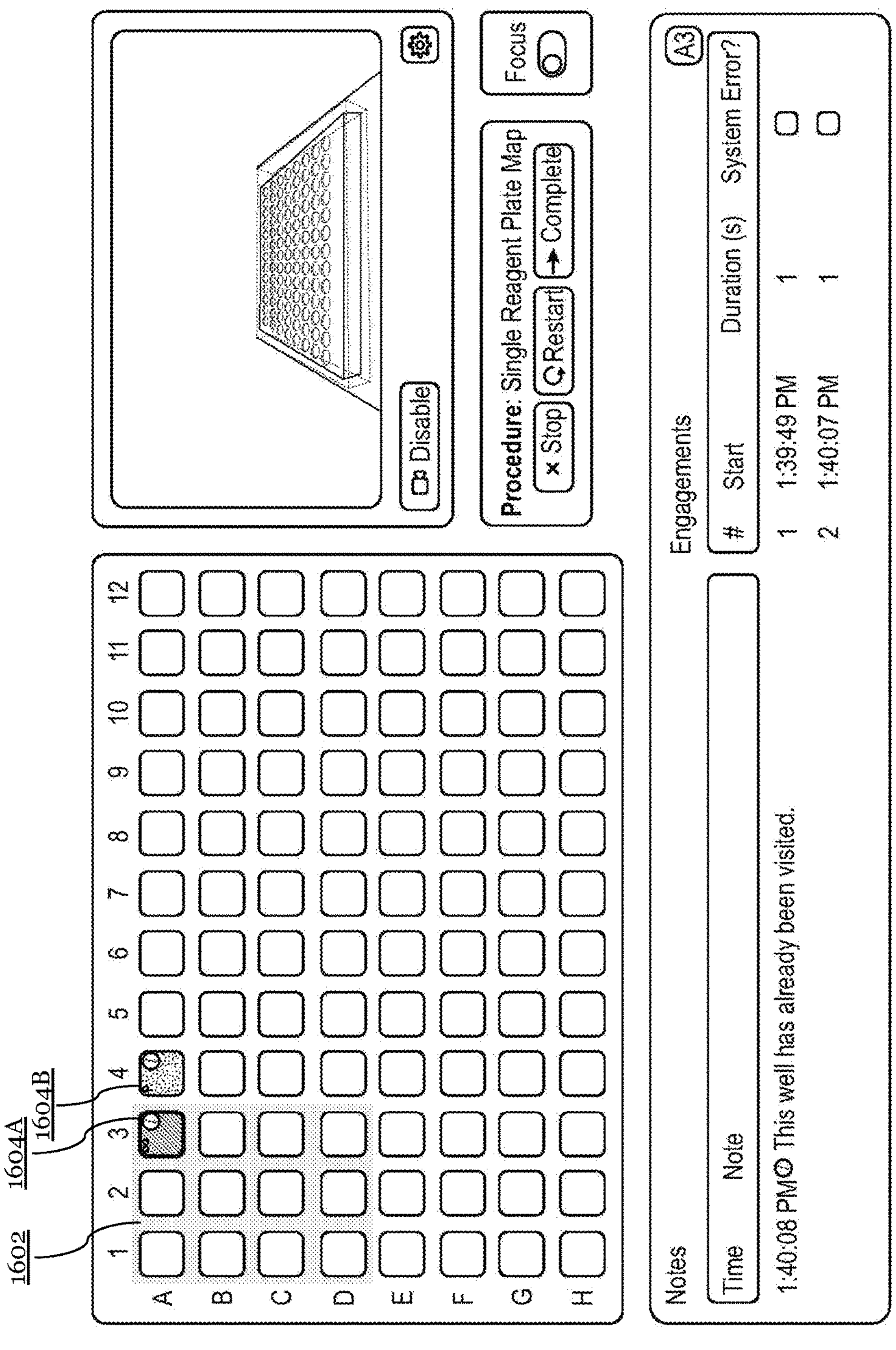

In some examples, the transfer rules include a constraint limiting a quantity of engagements between the transfer component and the reception component to a threshold quantity of engagements and transfer rule enforcer 1105 may determine that the recorded engagement has breached the at least one of the one or more predefined rules based at least in part on detecting that the quantity of engagements between the transfer component and the reception component has exceeded the threshold quantity of engagements. A non-limiting example may be depicted with reference to FIGS. 16A through 16E. For instance, at FIG. 16A, a liquid-transferring device may visit reception component A3 (e.g., corresponding to user interface display element 1604A), which may be recorded in a later frame as depicted in FIG. 16B. However, if reception component A3 has an associated transfer rule limiting the quantity of engagements to 1 and the liquid-transferring device visits reception component A3 a second time, the user interface may display a warning in the updated digital plate map and/or may indicate a guidance note indicating that the limited quantity of engagements has been exceeded as depicted in FIG. 16E.

In other examples, the transfer rules may include a constraint limiting a subset of reception components of the sample plate as eligible for engagements and the reception component whose liquid reception boundary has the intersection point with the pointing vector may be outside of the subset of the reception components. Accordingly, transfer rule enforcer 1105 may determine that the recorded engagement has breached the at least one of the one or more predefined rules based on detecting that the engagement occurred between the transfer component and the reception component outside of the subset of the reception components. A non-limiting example may be depicted with reference to FIGS. 16C and 16D. For instance, the user interface associated with FIG. 16C may depict a subset of reception components eligible for engagements that includes any reception components of rows A, B, C, and D that are in column 1, 2, or 3. However, in FIG. 16C, the transfer component of the liquid-transferring device may visit a reception component outside of this subset (e.g., reception component A4, which may correspond to user interface display element 1604B). Accordingly, the user interface, in FIG. 16D, may display a warning in the updated digital plate map and/or may indicate a guidance note indicating that the reception component is not included in the subset.

In yet other examples, the transfer rules may include a constraint limiting transfer paths between a set of reception components of the sample plate and a set of second reception components of a second sample plate. The transfer component of the liquid-transferring device may include a liquid retrieved from the set of second reception components when a corresponding engagement is recorded. Accordingly, transfer rule enforcer 1105 may determine that the recorded engagement has breached the at least one of the one or more predefined rules based on detecting that the engagement is associated with an invalid transfer path between the sample plate and the second sample plate. An example of a user interface configured to display an associated alert message may be shown with reference to FIG. 17.

As an additional example of transfer rules, logic may be encoded within liquid transfer detection system 101A that 20 μL of fluid is expected to be moved from a second sample plate and a sample plate (e.g., between reception component A1 of the second sample plate and reception component B2 of the sample plate). Liquid transfer detection system 101A may detect if the transfer component engages with reception component A1 followed by engaging with reception component B2. If this does not occur, the associated transfer rule may be breached.

Timing Deviation Detection and Assay Output Correction

In some embodiments, S270 may further include detecting timing deviations relative to a predefined liquid transfer protocol. In one or more embodiments, reference timing values may be specified within a protocol that define expected entry times, exit times, or dwell durations for liquid transfer engagements. By comparing the recorded entry and exit times obtained from temporal sequencing of engagement inferences with the reference timing values, one or more processors may determine a deviation between the actual timing of a liquid transfer event and the protocol-specified timing.

In operation, the detected timing deviation may be used to compute a correction factor associated with a measured assay output. For example, when a quenching reagent is dispensed earlier or later than specified by the protocol, the deviation may be correlated with a known impact on fluorescence readout or other assay measurements. The correction factor may then be applied to the measured assay output to generate a timing-adjusted assay result. In one or more embodiments, the correction factor may be derived from experimental calibration data linking deviations in timing to systematic shifts in assay performance.

In certain implementations, correction factors may be applied automatically by the system, producing adjusted results that more closely align with expected assay outcomes. In other embodiments, the correction factors may be output to the user interface as suggested adjustments, enabling operators to review and optionally apply the corrections. In both cases, the timing-adjusted assay results may be stored alongside original unadjusted measurements, supporting transparency and compliance with laboratory standards.

Accordingly, S270 may function to detect timing deviations and apply corrective analysis to assay results, thereby reducing the impact of operator variability on experimental outcomes and improving reproducibility, supporting root cause analysis, and enhancing the reliability of laboratory assays.

Figure 13:
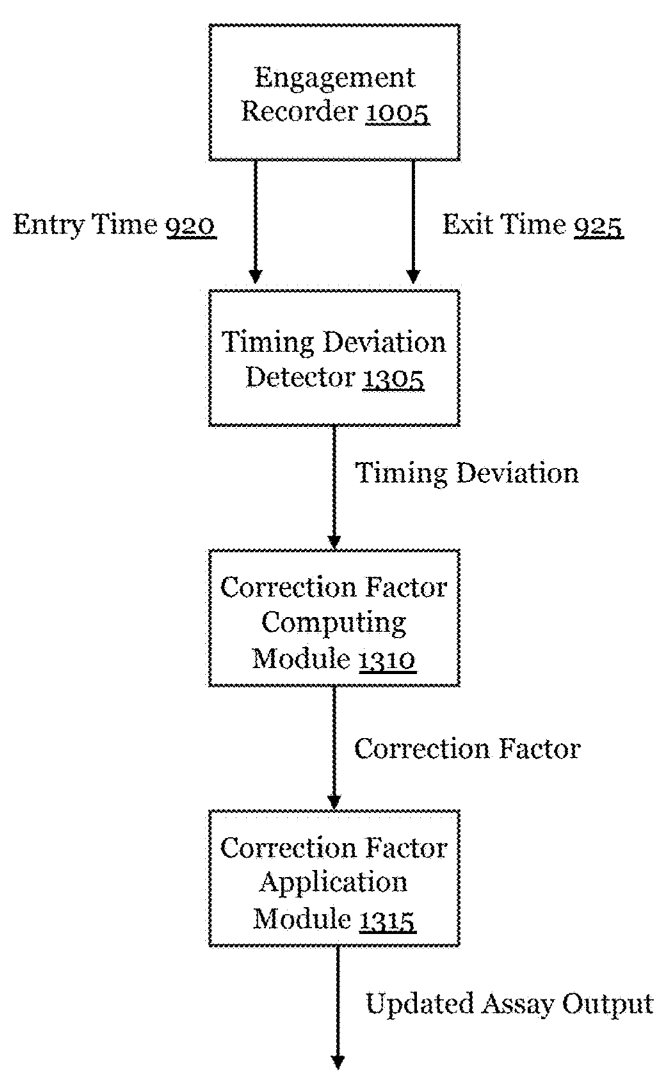
FIG. 13 illustrates an example assay output correction procedure 1300 in accordance with one or more embodiments of the present application.

In a non-limiting example, as described with reference to FIG. 13, timing deviation detector 1305 may receive an indication of an entry time 920 and an exit time 925 from engagement recorder 1005 and may determine, based on the entry time 920 and the exit time 925, a timing deviation relative to a reference timing defined by a predefined liquid transfer protocol. Timing deviation detector 1305 may provide an indication of the timing deviation to correction factor computing module 1310 and correction factor computing module 1310 may compute, based on the timing deviation, a correction factor associated with a measured assay output. Correction factor computing module 1310 may provide an indication of the correction factor to correction factor application module 1315 and correction factor application module 1315 may apply the correction factor to the measured assay output to generate a time-adjusted assay result (e.g., an updated assay output).

Error Condition Detection

In some embodiments, S270 may further comprise analyzing image data representing the region around the transfer component for error conditions that may impact liquid transfer integrity. In one or more embodiments, error conditions may include the presence of a bubble within the transfer component, a hanging droplet forming at the tip, excess liquid on an exterior surface of the transfer component, or physical defects such as incomplete attachment of the tip or improper tip size. Detection of such error conditions may be performed in conjunction with engagement inference generation, and results may be mapped into engagement statuses that include both positional classification and operational error reporting.

In operation, when an error condition is detected, the engagement status may be supplemented with an error condition message output via the user interface. The message may take the form of a visual warning displayed alongside the engagement status indicator, a color-coded overlay emphasizing the location of the anomaly, or an audible alert enabling rapid operator response. Error condition messages may also be stored together with temporal logs and image data, supporting retrospective analysis of anomalous assay results and ensuring traceability.

In certain embodiments, error condition detection may be enhanced by obtaining additional image data from a second sensing device positioned at a different angle relative to the transfer component. For example, a first sensing device may be positioned above the sample plate to capture top-down views of transfer component alignment, while a second sensing device may be positioned laterally to capture side views of the transfer component. Such multiple vantage points may improve the system's ability to identify subtle anomalies, such as small bubbles inside transparent transfer components or droplets forming beneath opaque transfer components, that may not be reliably captured from a single perspective.

In one or more embodiments, image data from multiple sensing devices may be fused or cross-referenced to validate error detections. Depth data captured from stereo or RGB-D cameras may confirm anomalies detected in two-dimensional images, thereby reducing false positives and increasing robustness. Engagement statuses generated in these embodiments may therefore integrate both liquid transfer position classification and error condition detection, ensuring comprehensive assessment of transfer component performance during liquid handling.

Accordingly, S270 may function to output enhanced engagement statuses that include error condition messages derived from multi-angle image analysis, thereby enabling early detection of subtle liquid transfer errors that could otherwise compromise assay accuracy.

Figure 14:
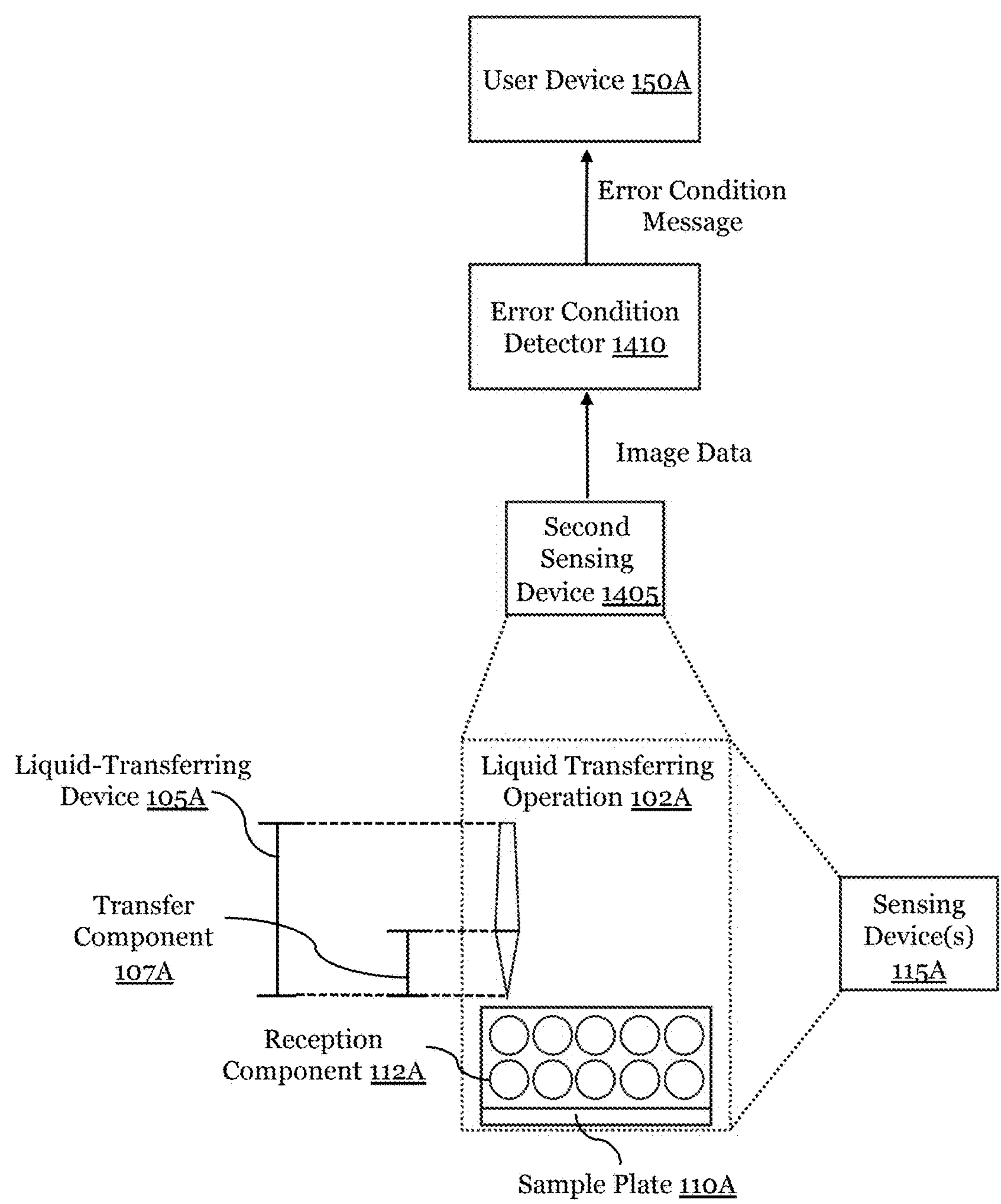
FIG. 14 illustrates an example error condition message procedure 1400 in accordance with one or more embodiments of the present application.

In a non-limiting example, as described with reference to FIG. 14, error condition detector 1410 may analyze the portion of the image data representing the region around the transfer component 107A (e.g., region 705 of FIG. 7) for an error condition. The error condition may include one of a presence of a bubble within the transfer component 107A, a hanging droplet on the transfer component 107A, excess liquid on an exterior surface of the transfer component 107A, an attachment defect of the transfer component 107A, or a size defect of the transfer component 107A. Error condition detector 1410 may output, via a user interface with user device 150A, an error condition message indicating the error condition.

Additionally, sensing device(s) 115A may collect image data (e.g., depth image data) and a second sensing device 1405 may collect additional image data, where second sensing device 1405 may be positioned at a different angle from the sensing device(s) 115A. In such examples, detecting the error condition may be based on the additional image data collected from the second sensing device 1405.

Fluid Transmission Tracking

In some embodiments, S270 may further include detecting successful transmission of fluid between the transfer component and the reception component. In one or more embodiments, the system may obtain additional image data from a second sensing device positioned at a different angle relative to the transfer component, such as a lateral view camera or a magnified imaging device focused on the transfer component. The additional image data may be analyzed to determine whether liquid has been aspirated into, or dispensed from, the transfer component during an engagement event.

In operation, the additional image data may be processed to identify optical indicators of fluid transfer, including visible meniscus motion within a transparent transfer component, changes in reflectivity associated with fluid movement, or the disappearance of droplets from the transfer component exterior. For instance, in a non-limiting example, one frame may show a transfer component as having liquid and being engaged with a reception component and a later frame may show the transfer component as having less liquid and being no longer engaged with the reception component, thus indicating that successful transmission has occurred. In certain implementations, depth-based imaging or thermal imaging may be applied to confirm changes in fluid volume, thereby increasing the robustness of transmission detection. The analysis of such image data may be integrated with engagement inference outputs to confirm that not only was the transfer component in the successful liquid transfer position but also that actual liquid transmission occurred.

In one or more embodiments, the engagement status may therefore be augmented with an indication of successful fluid transfer. For example, a status output may indicate both that the transfer component was within the rim boundary of the reception component and that a corresponding liquid volume was dispensed or aspirated. In some implementations, the system may further generate error messages when alignment is correct but no fluid transmission is detected, such as in cases of clogged transfer components or incomplete aspiration. Such messages may allow operators to identify and correct malfunctions that would otherwise lead to incomplete assays.

Accordingly, S270 may function to validate that a fluid exchange occurred between the transfer component and the reception component, thereby enabling comprehensive verification of operations by combining liquid transfer position analysis with confirmation of actual liquid transfer.

In a non-limiting example, as described with reference to FIG. 14, sensing device(s) 115A may collect image data (e.g., depth image data) and a second sensing device 1405 may collect additional image data, where second sensing device 1405 may be positioned at a different angle from the sensing device(s) 115A. In such examples, detecting the error condition may be based on the additional image data collected from the second sensing device 1405. In such examples, engagement status generator 145A may detect a successful transmission of fluid between the reception component 112A and the transfer component 107A based on the obtained additional image data, where the engagement status further indicates the successful transmission of the fluid.

Using Multiple Sensing Devices for Classification and Volume Estimation

In some embodiments, method 200 may include executing engagement classification and liquid volume estimation based on image data captured from a second sensing device. Such embodiments may function to supplement or operate independently of image data obtained from a primary sensing device (e.g., sensing device(s) 115A) by relying on additional viewpoints of a liquid-transferring operation. For example, image data captured from the second sensing device may be processed by a classifier or regression model, and outputs from the second sensing device may be combined with outputs from the primary sensing device to improve accuracy and robustness of engagement or volume detection.

The second sensing device may be positioned at an alternate viewpoint relative to sample plate 110A. In one or more embodiments, the second sensing device may be positioned at a side angle relative to sample plate 110A, such that the device captures a profile view of liquid-transferring device 105A and its transfer component.

In one or more embodiments, engagement classification may be performed directly on image data captured by the second sensing device. In such embodiments, a classifier may be applied to the full image or to a cropped region containing the transfer component tip, which may be identified using an object detection model. Depending on the view provided by the second sensing device, engagement classification may be executed with or without applying a projective transformation to the image data.

Additionally, or alternatively, in some embodiments, a regression model may be applied to image data from the second sensing device to estimate liquid volume within a transfer component. The regression model may be trained to detect optical cues observable from a side view, including liquid meniscus height, transparency gradients, or droplet formation at the tip of the transfer component. In such embodiments, volume estimation may be achieved without performing pointing vector generation, intersection point analysis, and/or projective transformations.

In operation, outputs generated from classifiers or regression models applied to image data from the second sensing device may be combined with outputs generated from the primary sensing device. Combination may occur through averaging, weighted selection, or confidence-based fusion strategies to generate a unified engagement or volume determination.

Calibration of Liquid-Transferring Devices Using Computer Vision-Based Volume Estimation In some embodiments, method 200 may further include applying engagement classification and liquid volume estimation to support calibration of liquid-transferring device 105A. Such embodiments may function to replace or supplement traditional balance-based calibration procedures by using image data captured from sensing devices to determine liquid volumes aspirated or dispensed by transfer components.

As referred to herein, liquid-transferring device calibration may include verifying whether a pipette or other liquid-transferring device dispenses an intended target volume of liquid. In traditional procedures, calibration may be performed by dispensing liquid onto a balance and recording the measured weight, which is converted to a volume value. The liquid-transferring device may then be adjusted until the dispensed volume matches the intended setting.

In one or more embodiments, liquid-transferring device calibration may be performed by using computer vision to estimate liquid volume within a transfer component of liquid-transferring device 105A. Image data captured by sensing device 115A or by a second sensing device may be processed by a regression model trained to output an estimated liquid volume. The estimated volume may then be compared against the intended setting of liquid-transferring device 105A to determine calibration accuracy.

Additionally, or alternatively, in some embodiments, liquid-transferring device calibration may occur continuously during regular operation of liquid-transferring device 105A. For example, during routine laboratory use, the system may periodically estimate volumes aspirated into or dispensed from the transfer component. If discrepancies between estimated and intended volumes exceed predefined tolerances, the system may flag liquid-transferring device 105A as out of calibration.

In further embodiments, liquid-transferring device calibration using computer vision may provide faster operation compared to other methods (e.g., balance-based methods). Since volume estimation may be performed directly from captured images, calibration may occur in real time without specialized equipment (e.g., balances). Such embodiments may reduce downtime, eliminate reliance on specialized equipment, and ensure that calibration checks are performed automatically and continuously during regular use.

3. Computer-Implemented Method and Computer Program Product

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A computer-implemented method for tracking liquid transfer between a liquid-transferring device and a sample plate, the computer-implemented method comprising:

obtaining image data, captured by at least one sensing device, from a liquid-transferring operation between the liquid-transferring device and the sample plate;

detecting, by one or more processors executing a computer vision model, a position and an orientation of a transfer component of the liquid-transferring device based at least in part on an input of the image data into one or more object pose estimation models;

generating, by the one or more processors, a pointing vector extending along a substantially central axis of the transfer component based on the detected position and the detected orientation of the transfer component;

determining, by the one or more processors, a liquid-reception boundary representing a rim of a reception component of the sample plate;

identifying, by the one or more processors, an intersection point of the pointing vector and the liquid-reception boundary;

detecting, by the one or more processors and based at least in part on the identified intersection point, whether the transfer component is within a successful liquid transfer position of the rim of the reception component, wherein the detecting comprises:

identifying a portion of the image data representing a region around the transfer component;

outputting, by an engagement inference classifier and based on the identified portion of the image data, an engagement inference indicating whether the position and the orientation of the transfer component is within the successful liquid transfer position relative to the rim of the reception component; and outputting, via a user interface and based at least in part on the engagement inference, an engagement status indicating whether the position and the orientation of the transfer component is within the successful liquid transfer position relative to the rim of the reception component.

2. The computer-implemented method according to claim 1, wherein detecting whether the transfer component is within the successful liquid transfer position further comprises:

performing a projective transform on the identified portion of the image data; and providing the transformed portion of the image data to the engagement inference classifier, wherein outputting the engagement inference is based on providing the transformed portion of the image data.

3. The computer-implemented method according to claim 2, further comprising:

providing the transformed portion of the image data to a regression model; and outputting, by the regression model, an estimation of a volume of liquid within the transfer component, thereby enabling detection of liquid transfer between the transfer component and the reception component.

4. The computer-implemented method according to claim 1, wherein detecting the position and the orientation of the transfer component is based at least in part on the position of the liquid-transferring device, the orientation of the liquid-transferring device, and a geometry of the liquid-transferring device.

5. The computer-implemented method according to claim 1, wherein:

the engagement inference indicates a likelihood that the transfer component is within one of two or more liquid transfer position categories, the two or more liquid transfer position categories comprising:

a first liquid transfer position category indicating that the transfer component is within the successful liquid transfer position, and a second liquid transfer position category indicating that the transfer component is outside of the successful liquid transfer position, and the engagement status comprises an identifier of the liquid transfer position that the engagement inference indicates is most likely.

6. The computer-implemented method according to claim 5, wherein:

the second liquid transfer position category indicates that the transfer component is outside of a near-boundary liquid transfer position, the two or more liquid transfer position categories comprise:

a third category that indicates that the transfer component is within the near-boundary liquid transfer position and outside of the successful liquid transfer position, and the engagement status comprises an identifier of the first category, the second category, or the third category that the engagement inference indicates is most likely.

7. The computer-implemented method according to claim 6, further comprising:

storing, in memory accessible to the one or more processors, the image data captured during the liquid-transferring operation;

retrieving, in response to the engagement inference indicating that the third category is most likely, a portion of the stored image data corresponding to a time interval preceding the outputting of the engagement inference; and outputting, via the user interface, the retrieved portion of the stored image data and a position identifier of the reception component relative to a plurality of reception components of the sample plate.

8. The computer-implemented method according to claim 1, wherein:

the engagement inference indicates that the transfer component is within the successful liquid transfer position of the reception component, and the computer-implemented method further comprises:

obtaining additional image data, captured by the at least one sensing device, from the liquid-transferring operation between the liquid-transferring device and the sample plate;

detecting, by the one or more processors executing the computer vision model, an updated position and an updated orientation of the transfer component of the liquid-transferring device based at least in part on an input of the additional image data into the one or more object pose estimation models;

generating, by the one or more processors, an updated pointing vector extending along a substantially central axis of the transfer component based on the updated position and the updated orientation of the transfer component;

identifying, by the one or more processors, an updated intersection point of the point vector and the liquid-reception boundary;

detecting, by the one or more processors and based at least in part on the updated intersection point, that the transfer component is outside of the successful liquid transfer position of the rim of the reception component, wherein the detecting comprises:

identifying a portion of the additional image data representing an updated region around the transfer component;

outputting, by the engagement inference classifier and based on the portion of the additional image data, an updated engagement inference indicating that the position and orientation of the transfer component is outside of the successful liquid transfer position relative to the rim of the reception component; and outputting, via a user interface and based at least in part on the updated engagement inference, an updated engagement status indicating that the position and the orientation of the transfer component is outside of a successful liquid transfer position of the rim of the reception component.

9. The computer-implemented method according to claim 1, further comprising:

obtaining additional image data, captured by the at least one sensing device, additional image data from the liquid-transferring operation between the liquid-transferring device and the sample plate;

detecting, by the one or more processors executing the computer vision model, an updated position and an updated orientation of the transfer component of the liquid-transferring device based at least in part on an input of the additional image data into the one or more object pose estimation models;

generating, by the one or more processors, an updated pointing vector extending along the substantially central axis of the transfer component based on the updated position and the updated orientation of the transfer component;

identifying, by the one or more processors, an updated intersection point of the pointing vector that is outside of the liquid-reception boundary; and outputting, via the user interface, an updated engagement status indicating that the transfer component is outside of the successful liquid transfer position of the rim of the reception component.

10. The computer-implemented method according to claim 1, wherein:

the sample plate comprises a plurality of reception components arranged in a first direction and a second direction parallel to the first direction, and the computer-implemented method further comprising:

determining a respective liquid reception boundary for each reception component of the plurality of reception components, each liquid reception boundary encompassing a respective area within a plane extending along the first and second direction;

identifying the reception component as a candidate reception component from among the plurality of reception components based on the intersection point being within the liquid reception boundary associated with the reception component, wherein the engagement inference indicates whether the position and orientation of the transfer component is within the successful liquid transfer position relative to the candidate reception component.

11. The computer-implemented method according to claim 1, wherein the engagement inference indicates that the transfer component is within the rim of the reception component, the computer-implemented method further comprising:

recording an engagement between the liquid-transferring device and the sample plate based on the engagement inference indicating that the transfer component is within the successful liquid transfer position of the rim of the reception component;

comparing the recorded engagement against one or more predefined transfer rules defining permitted and prohibited engagements of the transfer component with the reception component; and outputting, via the user interface, an engagement alert message indicating that the recorded engagement has breached at least one of the one or more predefined transfer rules based at least in part on the comparison.

12. The computer-implemented method according to claim 11, wherein:

the transfer rules comprise a constraint limiting a quantity of engagements between the transfer component and the reception component to a threshold quantity of engagements, and the computer-implemented method further comprises:

determining that the recorded engagement has breached the at least one of the one or more predefined rules based at least in part on detecting that the quantity of engagements between the transfer component and the reception component has exceeded the threshold quantity of engagements.

13. The computer-implemented method according to claim 11, wherein:

the sample plate comprises a plurality of reception components, the transfer rules comprise a constraint limiting a subset of the reception components as eligible for engagements, the reception component whose liquid reception boundary has the intersection point with the pointing vector is outside of the subset of the reception components, and the computer-implemented method further comprises:

determining that the recorded engagement has breached the at least one of the one or more predefined rules based at least in part on detecting that the engagement occurred between the transfer component and the reception component outside of the subset of the reception components.

14. The computer-implemented method according to claim 11, wherein:

the sample plate comprises a plurality of reception components, the transfer rules comprise a constraint limiting transfer paths between the plurality of reception components of the sample plate and a plurality of second reception components of a second sample plate, the transfer component of the liquid-transferring device includes a liquid retrieved from the plurality of second reception components of the second sample plate when the engagement is recorded, and the computer-implemented method further comprises:

determining that the recorded engagement has breached the at least one of the one or more predefined rules based at least in part on detecting that the engagement is associated with an invalid transfer path between the sample plate and the second sample plate.

15. The computer-implemented method according to claim 1, further comprising:

receiving, from the engagement inference classifier, successive engagement inferences corresponding to a plurality of frames of the image data;

generating, from the successive engagement inferences, a temporal sequence of classifications representing transitions of the transfer component relative to the reception component; and detecting, from the temporal sequence, an entry time and an exit time of the transfer component relative to the reception component; and outputting, via the user interface, the entry time and the exit time of the transfer component relative to the reception component.

16. The computer-implemented method according to claim 15, wherein the computer-implemented method further comprises:

storing, in a log accessible to the one or more processors, metadata associated with the temporal sequence, the metadata comprising one or more of:

the entry time of the transfer component, the exit time of the transfer component, a total duration between the entry time and the exit time, a position identifier of the reception component, a volume of liquid within the transfer component, a size of liquid within the transfer component, an indication of a presence of a bubble within the transfer component, an indication of a hanging droplet on the transfer component, an indication of excess liquid on an exterior surface of the transfer component, an indication of an attachment defect of the transfer component, an indication of a size defect of the transfer component, an orientation of the liquid-transferring device, a humidity associated with an environment in which the liquid-transferring operation is being performed, or a temperature associated with the environment in which the liquid-transferring operation is being performed;

receiving, via the user interface, a request for the metadata within the log; and outputting, via the user interface, the metadata within the log based at least in part on the received request.

17. The computer-implemented method according to claim 16, further comprising:

determining, based at least in part on the entry time and the exit time, a timing deviation relative to a reference timing specified by a predefined liquid transfer protocol;

computing, based at least in part on the timing deviation, a correction factor associated with a measured assay output; and applying the correction factor to the measured assay output to generate a timing-adjusted assay result.

18. The computer-implemented method according to claim 1, wherein the image data is collected from a first sensing device, the computer-implemented method further comprising:

obtaining additional image data captured from a second sensing device positioned at a different angle from the first sensing device;

analyzing the portion of the image data representing the region around the transfer component for an error condition, the error condition comprising one of:

a presence of a bubble within the transfer component, a hanging droplet on the transfer component, excess liquid on an exterior surface of the transfer component, an attachment defect of the transfer component, a quantity of liquid within the transfer component differing from a defined threshold quantity for the transfer component or relative to another transfer component of the liquid-transferring device, or a size defect of the transfer component;

detecting the error condition based at least in part on the additional image data collected from the second sensing device; and outputting, via the user interface, an error condition message indicating the error condition.

19. A computer-program product for tracking liquid transfer between a liquid-transferring device and a sample plate, the computer-program product comprising a non-transitory machine-readable storage medium storing computer instructions that, when executed by one or more processors, perform operations comprising:

obtaining image data, captured by at least one sensing device, from a liquid-transferring operation between the liquid-transferring device and the sample plate;

detecting, by one or more processors executing a computer vision model, a position and an orientation of a transfer component of the liquid-transferring device based at least in part on an input of the image data into one or more object pose estimation models;

generating, by the one or more processors, a pointing vector extending along a substantially central axis of the transfer component based on the detected position and the detected orientation of the transfer component;

determining, by the one or more processors, a liquid-reception boundary representing a rim of a reception component of the sample plate;

identifying, by the one or more processors, an intersection point of the pointing vector and the liquid-reception boundary;

detecting, by the one or more processors and based at least in part on the identified intersection point, whether the transfer component is within a successful liquid transfer position of the rim of the reception component, wherein the detecting comprises:

identifying a portion of the image data representing a region around the transfer component;

outputting, by an engagement inference classifier and based on the identified portion of the image data, an engagement inference indicating whether the position and the orientation of the transfer component is within the successful liquid transfer position relative to the rim of the reception component; and outputting, via a user interface and based at least in part on the engagement inference, an engagement status indicating whether the position and the orientation of the transfer component is within the successful liquid transfer position relative to the rim of the reception component.

20. A computer-implemented system for tracking liquid transfer between a liquid-transferring device and a sample plate, comprising:

one or more processors;

a memory;

a computer-readable medium operably coupled to the one or more processors, the computer-readable medium having computer-readable instructions stored thereon that, when executed by the one or more processors, cause a computing device to perform operations comprising obtaining image data, captured by at least one sensing device, from a liquid-transferring operation between the liquid-transferring device and the sample plate;

detecting, by one or more processors executing a computer vision model, a position and an orientation of a transfer component of the liquid-transferring device based at least in part on an input of the image data into one or more object pose estimation models;

generating, by the one or more processors, a pointing vector extending along a substantially central axis of the transfer component based on the detected position and the detected orientation of the transfer component;

determining, by the one or more processors, a liquid-reception boundary representing a rim of a reception component of the sample plate;

identifying, by the one or more processors, an intersection point of the pointing vector and the liquid-reception boundary;

detecting, by the one or more processors and based at least in part on the identified intersection point, whether the transfer component is within a successful liquid transfer position of the rim of the reception component, wherein the detecting comprises:

identifying a portion of the image data representing a region around the transfer component;

outputting, by an engagement inference classifier and based on the identified portion of the image data, an engagement inference indicating whether the position and the orientation of the transfer component is within the successful liquid transfer position relative to the rim of the reception component; and outputting, via a user interface and based at least in part on the engagement inference, an engagement status indicating whether the position and the orientation of the transfer component is within the successful liquid transfer position relative to the rim of the reception component.

* * * * *